US011487885B2

(12) United States Patent
Hersans

(10) Patent No.: US 11,487,885 B2
(45) Date of Patent: Nov. 1, 2022

(54) ENABLING AND VALIDATING DATA ENCRYPTION

(71) Applicant: salesforce.com, inc., San Francisco, CA (US)

(72) Inventor: Alexandre Hersans, Walnut Creek, CA (US)

(73) Assignee: Salesforce, inc., San Francisco, CA (US)

( * ) Notice: Subject to any disclaimer, the term of this patent is extended or adjusted under 35 U.S.C. 154(b) by 648 days.

(21) Appl. No.: 15/884,885

(22) Filed: Jan. 31, 2018

(65) Prior Publication Data
US 2019/0236284 A1    Aug. 1, 2019

(51) Int. Cl.
| | |
|---|---|
| *G06F 21/60* | (2013.01) |
| *G06F 3/06* | (2006.01) |
| *G06F 21/62* | (2013.01) |
| *H04L 9/40* | (2022.01) |

(52) U.S. Cl.
CPC .......... *G06F 21/602* (2013.01); *G06F 3/0623* (2013.01); *G06F 21/6218* (2013.01); *G06F 21/6227* (2013.01); *H04L 63/0428* (2013.01)

(58) Field of Classification Search
CPC .................................................. G06F 21/602
See application file for complete search history.

(56) References Cited

U.S. PATENT DOCUMENTS

| | | | | |
|---|---|---|---|---|
| 7,213,150 B1* | 5/2007 | Jain | ....................... | H04L 9/3239 |
| | | | | 713/168 |
| 8,041,940 B1* | 10/2011 | Natanzon | ............ | H04L 63/0485 |
| | | | | 713/153 |
| 8,135,958 B2* | 3/2012 | Greco | ................... | H04L 9/3236 |
| | | | | 713/189 |
| 8,423,798 B2* | 4/2013 | Shono | .............. | H04N 21/41422 |
| | | | | 713/300 |
| 8,861,727 B2* | 10/2014 | Resch | ..................... | H04L 9/085 |
| | | | | 380/46 |
| 2006/0115088 A1* | 6/2006 | Valentine | ............ | H04L 63/0428 |
| | | | | 380/270 |

(Continued)

FOREIGN PATENT DOCUMENTS

WO        WO-0193497 A1 * 12/2001    .......... H04L 9/0662

*Primary Examiner* — Jung W Kim
*Assistant Examiner* — Thanh H Le
(74) *Attorney, Agent, or Firm* — Holland & Hart LLP

(57) ABSTRACT

Methods, systems, and devices for enabling and validating data encryption are described. A data storage system (e.g., including a database and validation server) may receive an encryption request indicating a data object or data field. Prior to performing encryption, the validation server may perform one or more validations to determine whether the system supports encrypting the indicated data. The validation server may identify any formula fields that directly or indirectly (e.g., via other formula fields) reference the data object or field, and may determine whether each of these formula fields is encryption compatible. In some cases, the validation process may involve synchronously executing a first set of validators, marking the data as pending encryption, and asynchronously executing a second set of validators. Based on the results of the validation process, the system may or may not encrypt the indicated data, and may transmit an indication of the validation results.

20 Claims, 13 Drawing Sheets

(56) References Cited

U.S. PATENT DOCUMENTS

| | | | | |
|---|---|---|---|---|
| 2011/0142230 A1* | 6/2011 | Zuili | ................ | G06F 21/602 |
| | | | | 380/28 |
| 2011/0246369 A1* | 10/2011 | de Oliveira | ............ | G06Q 20/40 |
| | | | | 705/64 |
| 2018/0082078 A1* | 3/2018 | Suzuki | ................ | H04L 63/0428 |

* cited by examiner

# ENABLING AND VALIDATING DATA ENCRYPTION

FIELD OF TECHNOLOGY

The present disclosure relates generally to database systems and data processing, and more specifically to enabling and validating data encryption.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support encrypting data at rest in a database system. For example, a user may select to turn encryption on for a data object or data field storing sensitive information. However, encrypting the data may incur a tradeoff in functional capabilities, for example, with regards to filtering, sorting, or aggregating the encrypted data. Encrypting data that is used as an input for one or more of these functions (e.g., within a formula field) may result in errors or system crashes when attempting to perform these functions.

DETAILED DESCRIPTION

Figure 1:
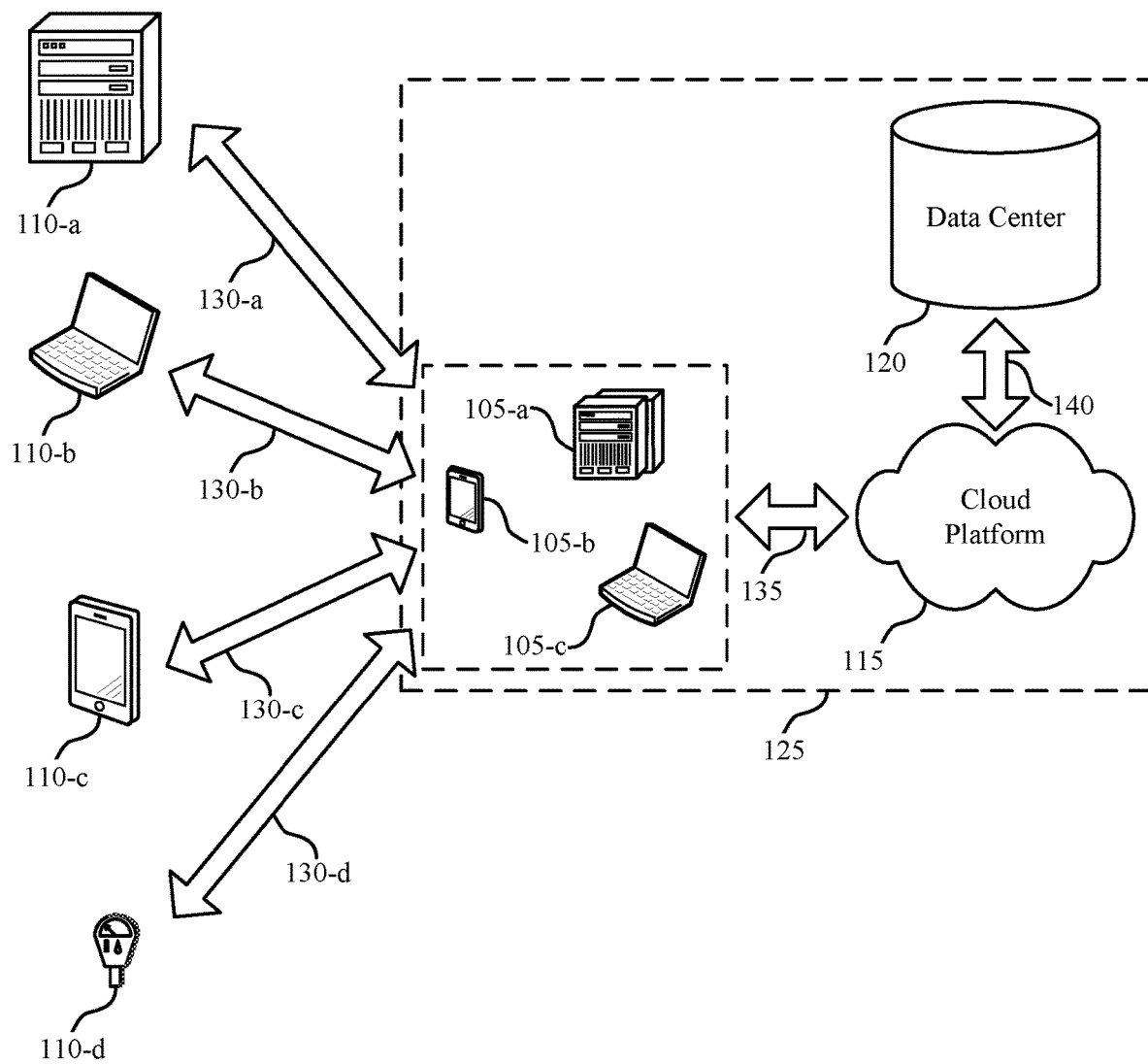
FIG. 1 illustrates an example of a system for data encryption that supports enabling and validating data encryption in accordance with aspects of the present disclosure.

In some database systems, a database may support storing data as encrypted ciphertext. A user, utilizing a user device, may turn on or off data encryption at rest for the database (e.g., on a tenant-by-tenant basis in a multi-tenant database system). In some cases, the user may select to encrypt specific data objects or data fields. To maintain separation of duty, the database system may perform data encryption at an application server, not at the database. In this way, the database system may not send any encryption keys into the database, increasing the security of encrypted data stored at the database. Accordingly, some processes or functions executed within the database may not support encryption, as the processes or functions may require plaintext inputs that are not available for data stored as ciphertext in the database. Encrypting data that is used in non-encryption compatible functions may result in errors, crashes, or inefficiencies within the database system.

To avoid encrypting any data objects or data fields that may result in system errors, the database system may implement a set of validation processes. An application server of the database system that performs these validations may be referred to as a validation server. When the database system receives an encryption request (e.g., to encrypt data, decrypt data, rotate a key, etc.) indicating a plaintext data object or field, the validation server may perform the set of validations to determine whether the indicated data is encryption compatible. In some cases, the database system may additionally perform validations when a user defines a new or updated formula field (e.g., to determine whether the new formula definition for the formula field includes any invalid references to encrypted data fields).

In some cases, the validation server may perform validation processes in multiple steps. For example, the validation server may perform an initial encryptability check on the data field marked for encryption to determine if the data field is a valid candidate for encryption (e.g., based on the data field type, an organizational perm, etc.). The validation server may then perform encryption compatibility checks in two phases. In a first synchronous phase, the validation server may execute a first round of validators to check for tenant-specific or user-specific customizations that may affect encryption of the data field. After the first phase, the validation server may mark the data field as "encryption pending," and may enqueue a second set of validators for a second asynchronous phase. The validation server may execute the second set of validators to identify any formula fields referencing, directly or indirectly (e.g., via formula field spidering), the data field marked for encryption. The database system may not encrypt the data field if any of the formula fields reference the data field in an encryption incompatible way (e.g., based on the operators and functions defined in the formula field). The validation server may send a message indicating the results of the encryption and validation process to the user device that initiated the encryption request. The message may indicate which data fields were encrypted and which data fields were not encrypted (e.g., based on a failed validation process), as well as why any data fields were not encrypted. The database system may implement such a validation process to efficiently protect against encrypting data or saving formula field definitions that do not support encryption.

Aspects of the disclosure are initially described in the context of an environment supporting an on-demand database service. Additional aspects of the disclosure are described with respect to systems and processes (e.g., encryption, validation, and field tracking processes). Aspects of the disclosure are further illustrated by and described with reference to apparatus diagrams, system diagrams, and flowcharts that relate to enabling and validating data encryption.

FIG. 1 illustrates an example of a system 100 for cloud computing that supports enabling and validating data encryption in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, a data center 120 may support data encryption. A cloud client 105 may select to store encrypted data at rest in the data center 120. The cloud client 105 may store all data associated with the cloud client 105 as encrypted ciphertext within the data center 120, or may select specific data objects or data fields for encryption. To maintain separation of duty, the cloud platform 115 may perform the data encryption using an encryption key, and the encryption key may not be passed into the data center 120 (e.g., to keep encrypted data stored in the data center 120 secure). Accordingly, some processes or functions executed within the data center 120 may not support encryption, as the processes or functions may use or modify plaintext inputs. Encrypting data that is used in non-encryption compatible functions may result in errors or crashes within the system 100.

To avoid encrypting any data objects or data fields that may result in system 100 errors, the system 100 may implement a set of validation processes. The cloud platform 115 may include a validation server, which may perform the set of validation processes in response to an encryption request. In some cases, the validation server may perform the validations in different steps. For example, the validation server may perform an initial encryptability check on the data field marked for encryption to determine if the data field is a valid candidate for encryption (e.g., based on the data field type, an organizational perm, etc.). The validation server may then perform encryption compatibility checks in two phases. In a first synchronous phase, the validation server may execute a first round of validators to check for tenant-specific or user-specific customizations that may affect encryption of the data field. After the first phase, the validation server may mark the data field in an encryption pending state, and may enqueue a second set of validators to execute in a second asynchronous phase. The validation server may execute the second set of validators to identify any formula fields referencing, directly or indirectly, the data field marked for encryption. The system 100 may not encrypt the data field if any of the formula fields reference the data field in a non-encryption compatible way (e.g., based on the operators and functions defined in the formula field). The cloud platform 115 may send the cloud client 105 a message indicating the results of the encryption process. For example, the message may indicate whether the indicated data field passed the validation process, and in some cases may include which data fields or formulas did not pass in the case of a failed validation.

Figure 2:
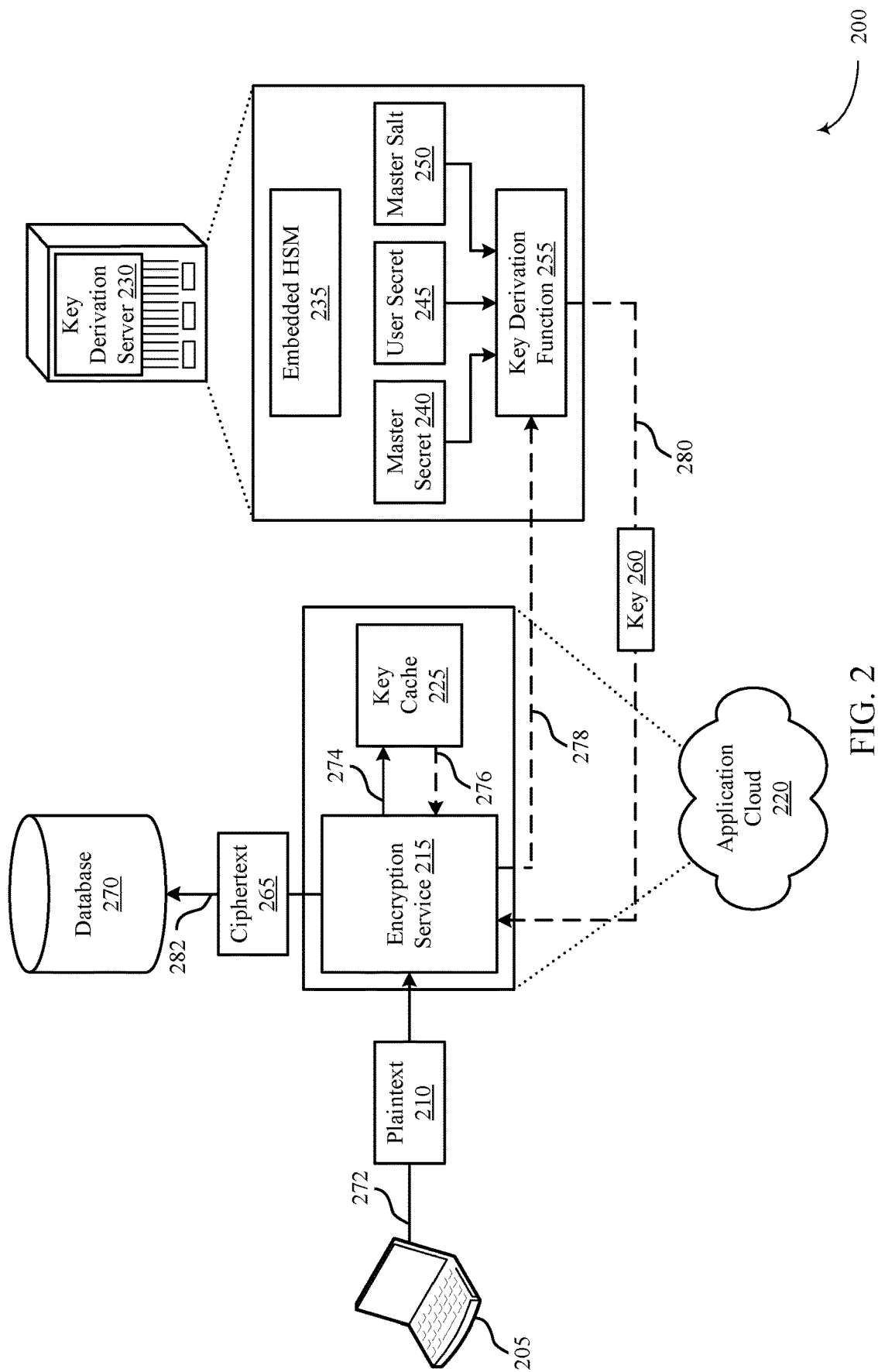
FIG. 2 illustrates an example of an encryption process that supports enabling and validating data encryption in accordance with aspects of the present disclosure.

FIG. 2 illustrates an example of an encryption process 200 that supports enabling and validating data encryption in accordance with various aspects of the present disclosure. Encryption process 200 may be initiated by a user device 205, which may be an example of a cloud client 105 or a contact 110 as described with reference to FIG. 1. The user device 205 may send a data object to a database 270 to be stored. In some cases, the data object may include one or more plaintext data fields that are designated for encryption. The plaintext 210 may be encrypted in an application cloud 220 based on an encryption key 260 generated by a key derivation server 230. In some case, the database 270 and the key derivation server 230 may be components of a data center 120 as described with reference to FIG. 1. Encryption process 200 may convert the plaintext 210 into ciphertext 265, and may store the ciphertext 265 at the database 270.

A database 270 may implement encryption to block users without a certain authorization level from viewing data. Encryption may provide security for data at rest (i.e., data stored at the database 270), and may not provide security for data being transmitted or received. In some cases, the database 270 may additionally implement security for data being transmitted or received, such as transport layer security. In some cases, a user may turn encryption on or off, and may specify the data for encryption. Some examples of data a user may select to encrypt include personally identifiable information (PII), sensitive, confidential, or proprietary data, or any other data that the user wants to stop unauthorized users from accessing in the database 270. In some cases, the encrypted data may be a data field within a data object, a data file, or an attachment.

Encryption process 200 may be an example of probabilistic encryption (i.e., non-deterministic encryption, such as strong symmetric non-deterministic encryption), or may be an example of deterministic encryption. In one example, encryption process 200 may be probabilistic encryption utilizing the Advanced Encryption Standard (AES) with 256-bit keys. Encryption process 200 may additionally use cipher block chaining (CBC), public key cryptography standards (PKCS) for padding (e.g., PKCS #5), a random initialization vector (IV), or any combination thereof.

At 272, a user device 205 may send a data object to database 270 for storage. The data object may first be sent to the application cloud 220, which may include encryption service 215 and key cache 225. In some cases, the encryption service 215 and key cache 225 may be components of a database server, which may be a component of a data center 120, as described with reference to FIG. 1. The data object sent to the encryption service 215 may include a set of data fields (e.g., an organization identifier field, a name field, a phone number field, a price field, etc.). In some cases, one or more of the data fields may be designated for encryption. For example, a user may select to encrypt the name field. In some cases, the user may additionally select an encryption scheme (e.g., deterministic encryption or probabilistic encryption) for the data field. When the data object is received at the encryption service 215, a runtime engine may determine whether the data object contains any data designated for encryption. The encryption service 215 may identify the name field, and may initiate encryption of the plaintext 210 corresponding to the name field of the data object.

At 274, the encryption service 215 may request an encryption key 260 from the key cache 225. An encryption key 260 that was recently used may be stored in the key cache 225, which may be an example of an application server cache. For example, when the encryption service 215 encrypts data using an encryption key 260, the encryption service 215 may store the encryption key 260 in the key cache 225. The encryption key 260 may not persist in the key cache 225. For example, the key cache 225 may flush its storage or remove the encryption key 260 based on a cache replacement algorithm (e.g., a least recently used (LRU) cache algorithm). The key cache 225 may identify whether it contains the active encryption key 260 corresponding to the data field to be encrypted (e.g., based on metadata associated with the data object or the data field). If the key cache 225 identifies the encryption key 260, the key cache 225 may send the encryption key 260 to the encryption service 215 at 276. Otherwise, the key cache 225 may send an indication to the encryption service 215 that the key cache 225 does not have the encryption key 260. In some cases, the key cache 225 may not send anything to the encryption service 215, and the encryption service 215 may determine to derive the encryption key 260 based on not receiving a response from the key cache 225.

At 278, the encryption service 215 may send a derivation request to a key derivation server 230 based on not receiving the encryption key 260 from the key cache 225. The key derivation server 230 may include one or more embedded hardware security modules (HSMs) 235, a master secret 240, a user secret 245, a master salt 250, or some combination thereof. The embedded HSMs 235 may be examples of computing devices used to secure and manage any encryption keys 260. The master secret 240 and the master salt 250 may be generated periodically or aperiodically (e.g., at the start of each new software release). The master secret 240 may be generated based on a master HSM, which may be physically located at a different location than the key derivation server 230. The user secret 245 may be input by a user or generated on demand based on the embedded HSMs 235. The master secret 240, the user secret 245, the master salt 250, or any combination of these may be input into a key derivation function 255 (e.g., a password-based key derivation function 2 (PBKDF2)). Based on receiving the derivation request, and the master secret 240, the user secret 245, the master salt 250, or a combination of these, the key derivation function 255 may generate an encryption key 260. At 280, the key derivation server 230 may send the encryption key 260, which itself may be encrypted, to the encryption service 215 or the key cache 225.

The encryption service 215 may receive the encryption key 260 (e.g., either from the key cache 225 or the key derivation server 230) and may use the encryption key 260, along with a random IV to encrypt the plaintext 210 into ciphertext 265. The encryption service 215 may then store the encryption key 260 in the key cache 225. At 282, the encryption service may store the data object, including the ciphertext 265 for the encrypted data field, in the database 270, along with metadata associated with the data field. The associated metadata may include an indication that the data field contains ciphertext 265, an identifier of the user secret 245 used to derive the encryption key 260, the random IV used for encryption, or a combination of these identifiers.

In some cases, data already stored in the database 270 may be selected for encryption, re-encryption, or decryption.

For example, a user may select to turn encryption on for a data field, where one or more data objects stored in the database 270 contain the data field. The data field may be defined in the universal data dictionary (UDD), and may be an example of a standard field, custom field, file, attachment, object, index, internal information (e.g., such as internal columns for a messaging service data model), or any similar encryption-supported data field. In some cases, a data field marked for encryption may be a component of a bundle, where encrypting a first data field may automatically encrypt a corresponding second data field bundled with the first data field based on one or more hard coded inter-dependencies. Examples of bundles may include email bodies bundled with corresponding email attachments, some account fields bundled with corresponding contact fields, or any other similar bundled data fields.

In addition to encryption and decryption, the database 270 may perform key rotation (e.g., generating a new active encryption key 260, and archiving or revoking an existing encryption key 260) or encryption scheme modification (e.g., between probabilistic and deterministic). In any of these cases, the database 270 may send the data objects or the plaintext 210 stored in the indicated data field to the application cloud 220 or a database server for encryption, re-encryption, or decryption. In some cases, the database 270 may send batches of data objects or data fields (e.g., in portioned data chunks or record groups) for mass encryption, mass re-encryption, or mass decryption in order to reduce overhead associated with the encryption process at any one time. In other cases, the database 270 may perform encryption, re-encryption, or decryption on a data object when the data object is retrieved or referenced by a user (e.g., using a lazy encryption scheme). These encryption processes may run as background jobs, and the database 270 or application cloud 220 may limit the processing power or memory allocated for these encryption processes in order to perform other processing jobs simultaneously.

In some cases, encryption process 200 may incur a tradeoff between data security and functionality. For example, in some cases, probabilistic encryption may support less functionality than deterministic encryption, but may provide better data security. The database 270 may support a set of functions for a user to perform on data objects in the database 270 or application cloud 220. However, some of these functions may not be designed to run on encrypted data (i.e., ciphertext 265). For example, the database 270 may not include support for filtering, sorting, or aggregating encrypted data objects. Accordingly, if encryption process 200 encrypts a data object or data field that is used (e.g., by a process of the database 270 or application cloud 220, or by another data field, such as a formula field) as an input for unsupported functionality, the system may crash or lead to incorrect results. To avoid these problems, the database 270 or application cloud 220 may implement one or more validators for encryption. The validators may determine whether a data object or data field marked for encryption is used in any operation that does not support ciphertext 265. If a validator identifies such an operation, the validator may refrain from encrypting the data object or field, and may send an indication of the failed encryption process to the user device 205. If no validators identify encryption incompatible operations referencing the data object or field, the application cloud 220 may perform the encryption process 200, and may indicate that the data object or field includes encrypted data. An indication of the successful encryption process 200 may or may not be sent to the user device 205.

The database system may be structured to support dynamic capabilities for data fields based on whether or not the fields are encrypted. Instead of defining functionality—such as filtering and sorting—strictly based on a data field type, the database 270 or application cloud 220 may include logic to determine the supported functionality. For example, platform code may retrieve application programming interface (API) functionality at the information layer, and may consolidate logic for determining the functionality (e.g., based on external entities, whether encryption is turned on, etc.) into API methods such as isAPIFilterable( ) or isAPIsortable( ). In some cases, these methods may apply to filterability and storability in the API (e.g., when executing object query language queries), and may not apply to other types of filtering or sorting, such as list views or reports. In addition to dynamically determining supported functionality based on logic, the system may dynamically determine the operators supported for certain data fields. Additionally or alternatively, the database 270 or application cloud 220 may implement a similar dynamic approach for list view, reports, or other types of functions or processes.

Figure 3:
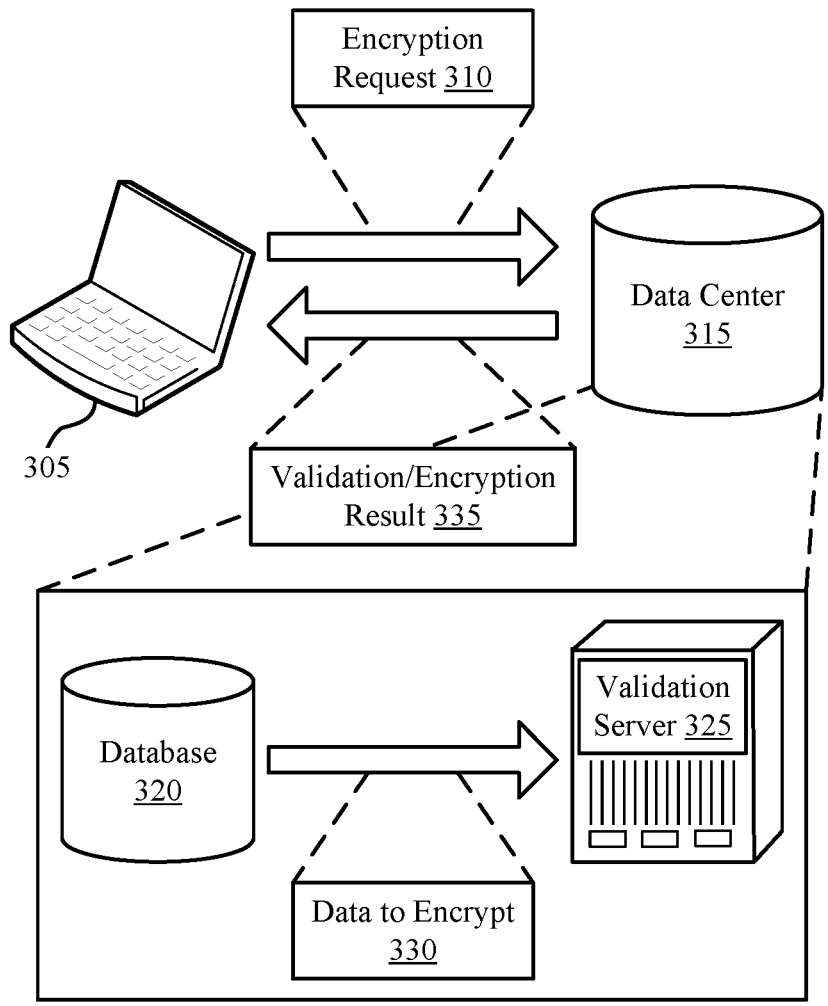
FIG. 3 illustrates an example of a system that supports enabling and validating data encryption in accordance with aspects of the present disclosure.

FIG. 3 illustrates an example of a system 300 that supports enabling and validating data encryption in accordance with various aspects of the present disclosure. The system 300 may include a user device 305 interacting with one or more components of a data center 315. For example, the user device 305 may communicate with a database 320, a database server, or a validation server 325. In some cases, the user device 305 may be an example of a user device 205 or a cloud client 105, the data center 315 may be an example of a data center 120, and the database 320 may be an example of a database 270, as described above with reference to FIGS. 1 and 2. The data center 315 may implement one or more operations to support encryption enablement and validation based on inputs from the user device 305.

A user operating the user device 305 may send an encryption request 310 to the data center 315 for one or more data objects or fields. For example, the user may turn on encryption at rest for a data object type or data field type in the user interface (UI) (e.g., in an object manager, schema wizard, key management page, or some other dedicated page) of user device 305, or in an API (e.g., in a CustomField bean of the metadata API). In some cases, the data center 315 may perform metadata management using a field attributes table in order to track data encryption. The data center 305 may cache the field attributes table at runtime using a custom schema cache, and may perform metadata tracking using one or more option bits. In other cases, the data center 305 may utilize a special organization preference to indicate and track whether encryption is turned on or off for a data entity without additional metadata tracking. Turning on encryption may trigger sending the encryption request 310 to the data center 315.

When the data center 315 receives an encryption request 310, the data center 315 may identify the data objects or data fields marked for encryption. In some cases, the data center 315 may perform a mass encryption process. The database 320 may determine the data objects or data fields indicated by the encryption request 310, and may send the data to encrypt 330 (e.g., in a single chunk or in multiple batches) to an application server for encryption, or to a validation server 325 for validation. In other cases, the data center 315 may perform lazy encryption. When the data center 315 receives a request to access (e.g., update or retrieve) data stored in the database 320, the database 320 may determine whether the accessed data is marked for encryption. For data objects or fields stored as plaintext in the database 320 but marked for encryption based on a previous encryption request 310, the database 320 may send the data to encrypt 330 to an application server or validation server 325 upon identifying the plaintext.

In some cases, the data to encrypt 330 may be used by one or more formulas or functions within the data center 315 (e.g., as part of a formula field, workflow process, rule or validation rule, flow engine, UI, default value calculator, etc.). A formula may be an example of a data field, but instead of storing a set value (e.g., numbers or text), the formula may store an equation or operation to be executed at runtime. The formula may contain conditional statements, functions, operators, references to standard or custom fields, or any combination of these or other features for determining the value at runtime. To calculate the value for a formula or function, the data center 315 (e.g., at an application server) or user device 305 may host a formula engine, which may perform a pointwise or bulk evaluation of the formula. For a pointwise evaluation, the formula engine may evaluate each function and operator of the formula in memory at an application server. For a bulk evaluation, the formula engine may generate a query language snippet (e.g., a structured query language (SQL) snippet, an object query language snippet, etc.), and may combine the snippet into a larger query. The database 320 or a server may process the query, and may compute the value for the formula on the fly based on the snippet and the data objects involved in the query processing. In either the pointwise or bulk case, the formula engine may support calculating a specific value for the formula or function during runtime processing.

For formula evaluation using query processing, a query optimizer (e.g., in the database 320) may instantiate one or more field objects, where each field object type corresponds to a selected field and a fetched field value. The query optimizer may perform query logic on the instantiated field objects based on a UDD. In some cases, the data center 315 may support encryption—and, correspondingly, decryption—for some data field object types (e.g., strings, dates, etc.) and may not support encryption for other data field object types.

Similarly, formulas or functions may support encrypted data inputs and encrypted data outputs based on the field object types, the method for formula evaluation, or both. In a first example, the data center 315 may support encrypted return values of the supported field object types for formulas, as the data center 315 may include encrypted versions of these field objects for handling ciphertexts. Additionally, the data center 315 may support isBlank( ), isNull( ), or any similar functions that do not involve decrypting ciphertext, regardless of the formula return type. In a second example, the data center 315 may perform encryption, decryption, or both at an application server. Accordingly, in-memory evaluations of formulas may be supported at application servers, as encrypted data may first be decrypted before calculating a value for the formula. In this way, pointwise formula evaluations may support encrypted data (e.g., by implementing in-memory techniques), while bulk formula evaluations incorporating SQL snippet generation may not support encrypted data, as SQL queries may be executed within the database 320. In some cases, the formula engine may implement evaluation in memory for some operations, and may implement snippet generation for other operations. For example, the formula engine may evaluate formulas in memory for workflow field updates, rules (e.g., workflow rules and validation rules), approval processes, UIs, default values, or some combination of these or other operations. Accordingly, these operations may handle encrypted data as inputs, as an application server may first decrypt these inputs before evaluating the formulas. Other operations may utilize snippet generation, including but not limited to formula fields and/or flow engines, and may not handle encrypted data as inputs, as the database 320 may not be capable of decrypting the inputs prior to evaluating the formula. The data center 315 may implement additional functionality to support formula fields (e.g., custom or standard formula fields) referencing encrypted data fields.

To handle a subset of operators and functions within a database 320, the data center 315 may process a SQL query in the database 320 using encrypted data. The results of the SQL query, some of which may include ciphertexts, may be passed to an application server, where the ciphertexts may be decrypted. Such a procedure may correctly evaluate formulas that do not alter ciphertexts and do not include logic depending on ciphertext values. A defined set of formula grammar for the formulas may include a subset of operators and functions that are encryption compatible using this procedure. However, this procedure may result in incorrect values for operators or functions that alter ciphertexts or perform logic based on the ciphertext values. This may be due to probabilistic encryption, as the same plaintext values may be encrypted as different ciphertext values. Additionally or alternatively, this may be due to separation of duty, as the database 320 may not access any encryption keys to decrypt the data and determine the plaintext values. Accordingly, queries executed in the database 320 may not be able to read plaintext, and may not be able to determine unicity or external identifiers based on non-deterministic ciphertexts.

To determine whether a formula may handle encrypted data (e.g., as described above) or may not handle encrypted data (e.g., if the formula contains operators or functions that alter ciphertexts or perform logic based on the ciphertext values), the data center 315 may implement a validation server 325. The data center 315 may handle any formula field referencing an encrypted field as if the formula field is also encrypted. Accordingly, the data center 315 may apply the same rules and considerations to such a formula field as would apply to an encrypted field. For example, the data center 315 may not filter or sort on a formula field referencing one or more encrypted fields. The validation server 325 may run an encryption validation service in order to determine whether each formula field referencing the data to encrypt 330 supports encrypted data.

The validation service may be an example of a validator. The validation service may identify each formula field that directly or indirectly references the data to encrypt 330. For example, the validation server 325 may use an externalized reference table to determine which custom formula fields (e.g., user-specific or tenant-specific formula fields) reference a certain data field. To determine which standard formula fields (e.g., formula fields universal across users or tenants) reference the data field, the validation server 325 may perform parsing of a field definition table (e.g., searching for one or more field names) to determine any standard formula fields that reference the data field. The validation server 325 may perform pattern matching to resolve the representations of the formulas to determine whether a snippet of an encoded formula field corresponds to a standard formula field. The identified formula fields (e.g., both custom and standard) that reference the data to encrypt 330 may correspond to a same data object or entity as the data to encrypt 330, or may correspond to a different data object or entity where a foreign key indicates the data object or entity of the data to encrypt 330.

The validation server 325 may determine whether the identified formula fields follow a set of rules for encryption compatibility. For example, the set of rules may specify a set of functions or operators that may be performed on encrypted data without breaking the system or leading to errors. An example set of functions may include concatenation, spanning, one or more informational functions (e.g., isBlank( ), isNull( ), blankValue( ), nullValue( ), etc.), one or more logical functions (e.g., if( ), case( ), etc.), one or more text functions (e.g., image( ), hyperlink( ), etc.), or any other functions that do not require plaintext inputs. If the validation server 325 identifies a formula field referencing the data to encrypt 330 that does not support encryption, the validation server 325 may halt the encryption process. The data center 315 may refrain from encrypting some or all of the data to encrypt 330 to avoid breaking the formula field definitions.

In some cases, the data center 315 may send the user device 305 an indication of a validation or encryption result 335. For example, if the data to encrypt 330 passes the validators of the validation server 325 and is encrypted, the data center 315 may send an encryption result 335 message to the user device 305 indicating the successful encryption process. If the data to encrypt 330 fails at least one validator of the validation server 325, the data center 315 may send a validation result 335 message indicating the data to encrypt 330 that was not encrypted. In some cases, the data center 315 may identify the one or more formula fields that caused the validation process to fail, and may include an indication of these formula fields in the validation result 335 message. A user operating the user device 305 may view these result messages in a UI of user device 305.

While the above processes are described with reference to an encryption process, it should be noted that an encryption process may refer to encryption, decryption, or re-encryption. The data center 315 may employ similar procedures to those described above in order to support encrypted data for decryption or re-encryption with a different encryption key.

The validation server 325 may additionally run validators when a formula field is saved. For example, if a user defines a custom formula field, the data center 315 may send the custom formula field definition to the validation server 325. The validation server 325 may run a validator, referred to as a formula encryption visitor, on the custom formula field definition. The formula encryption visitor may parse the formula to determine if the formula references any encrypted data fields. For example, validation server 325 may instantiate an abstract syntax tree (AST) based on the formula field definition, and the formula encryption visitor may perform a set of processes for walking through the AST. One process of this set of processes may identify any references to one or more encrypted data fields within the formula definition. For each identified reference to an encrypted data field, the formula encryption visitor may determine whether the data field is used with encryption compatible operators and functions. The validation server 325 may run this validator to check for encrypted field references at design time when the formula field is created or updated. To improve efficiency, the data center 325 may include an indication (e.g., a flag) of whether the formula is instantiated during design time or runtime, and the validation server 315 may refrain from performing the encryption specific validation at runtime in order to reduce server resource overhead.

If the formula does not reference encrypted data fields, or if any referenced encrypted data fields are processed in encryption compatible ways, the custom formula field definition may pass the validator, and the data center 315 may save the custom formula field. In some cases, the validation server 325 or database 320 may store indications of the referenced encrypted data fields for the new or updated custom formula field. In contrast, if the formula references an encrypted data field in an incompatible way, the validation server 325 may send a validation result 335 message to the user device 305 indicating that the custom formula field definition did not pass the validator. In some cases, the formula encryption visitor may indicate in the validation result 335 the encrypted data field or portion of the formula definition that resulted in the failed validation process. In these cases, the data center 315 may not save the new or updated version of the formula field based on the failed validation process. In this way, the formula encryption visitor may operate in at least two validation modes. At design time, the formula encryption visitor may throw an error if it encounters an unsupported reference to an encrypted field. Additionally, at validation time, the validation server 325 may utilize the formula encryption visitor to identify any incompatibilities for the validation server 325 to report back to the user device 305 in a validation result 335 message. The validation server 325 may perform logging to store in memory a record of the number of referencing formula fields identified, the number of formula visits performed, etc.

Additionally or alternatively, the validation server 325 may include an encryption incompatibilities validator. When the data center 315 saves a custom formula field definition to memory (e.g., after passing the formula encryption visitor validator) that includes a valid reference to an encrypted data field, the encryption incompatibilities validator may mark the custom formula field with a "might reference ciphertext" indicator. Based on this indicator, data center 315 may handle the custom formula field as an encrypted field, following all considerations, rules, and limitations that the system 300 implements for encrypted data fields. For example, if a non-encryption compatible metadata operation includes a test for encrypted data (e.g., using a "mightHaveEncryptedData( )" method), the "might reference ciphertext" indicator may return the same result as a "might have mixed data" indicator (e.g., even though the "might reference ciphertext" indicates a reference to a field that may be encrypted and the "might have mixed data" indicates that the data field itself may include encrypted data). Validations that block non-encryption compatible operations (e.g., filtering, criteria-based sharing, etc.) may apply to fields with either of these indicators.

The data center 315 or validation server 325 may clean the indicators for a data field following a decryption process (e.g., a mass decryption or lazy decryption process). For example, after a partial or full decryption process, the validation server 325 may check whether a field still may contain ciphertext or references another field that may contain ciphertext. Accordingly, if all of the data fields referenced by a formula field are cleaned during a decryption process, the data center 315 may remove the "might have mixed data" tag from each of these fields, and may correspondingly remove the "might reference ciphertext" tag from the formula field. In this case, the data center 315 may return access to a larger set of functions and operators for the formula field based on removing the "might reference ciphertext" indication.

Figure 4:
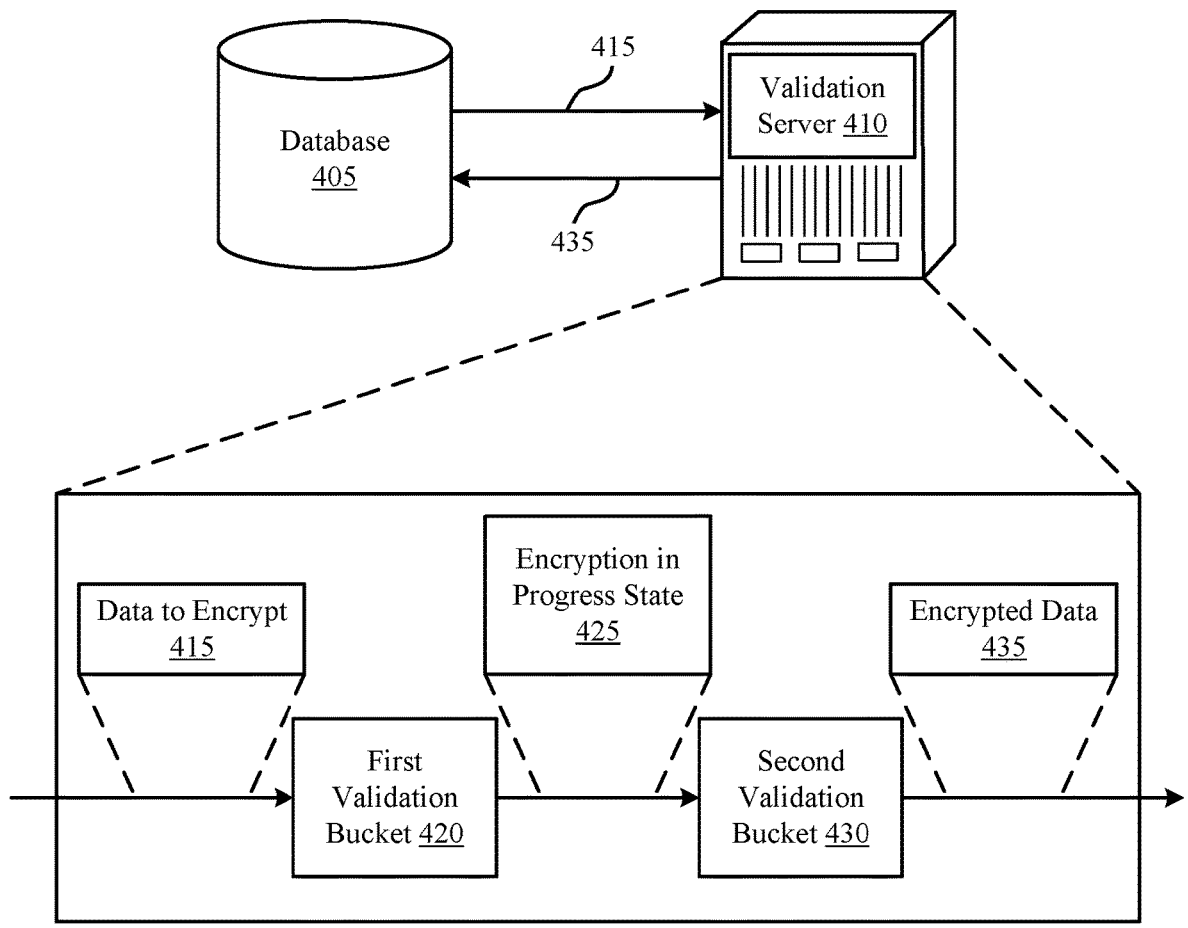
FIG. 4 illustrates an example of a database system that supports enabling and validating data encryption in accordance with aspects of the present disclosure.

FIG. 4 illustrates an example of a database system 400 that supports enabling and validating data encryption in accordance with various aspects of the present disclosure. The database system 400 may be an example of or a component of a data center 120 or 315 as described above, for example, with reference to FIGS. 1 and 3. The database system 400 may include a database 405 and a validation server 410, which may be examples of the corresponding devices described with reference to FIG. 3. The database system 400 may receive an encryption, decryption, or re-encryption request from a user device, or may receive a new or updated function definition (e.g., a custom formula field definition). Using either mass encryption, lazy encryption, or some other encryption technique, the database 405 may send data objects or data fields associated with the encryption request or function definition to the validation server 410. The validation server 410 may receive this data to encrypt 415, and may perform an enablement lifecycle to determine whether the encryption request or function definition follows a set of encryption compatibility rules. The validation server 410 or an associated application server may encrypt any data to encrypt 415 that passes the multi-step validation process, and may return the resulting encrypted data 435 to be stored at the database 405.

The validation process may include an encryptability check, an encryption compatibility check at a first validation bucket 420, an encryption pending state 425, and an encryption compatibility check at a second validation bucket 430. For example, the validation server 410 may receive the data to encrypt 415, and may perform an encryptability check on the data. Performing the encryptability check may involve the validation server 410 determining whether the data to encrypt 415 supports encryption. An encryptable field may have several attributes, including a data type (e.g., textual or binary data), a state (e.g., an encryptable field state enum may indicate plain, pending, or enabled encryption), a scheme (e.g., an encryptable scheme enum may indicate probabilistic, case-sensitive deterministic, case-insensitive deterministic, or no encryption), data properties (e.g., plaintext, ciphertext, ciphertext from a rotated encryption key, ciphertext from a destroyed encryption key, ciphertext from a different key flavor, ciphertext from a different case, etc.), or any combination of these attributes. In some cases, encryption enablement and validation may be handled differently for text data and binary data. For example, in some cases, the validation server 410 may validate binary data in the first validation bucket 410 without passing through the encryption pending state 425 or the second validation bucket 430, while validating text data using the full set of validators. Similarly, a mass encryption process may be performed differently for the two types of data.

In some cases, one or more data fields, data field types, data objects, or data object types may not be encryption compatible. Additionally or alternatively, encryption may be turned off for a data entity (e.g., by a tenant or org perm). Examples of encryption incompatible data entities may include rich text area (RTA) or number field types, custom external or custom metadata objects, or any other data entities for which the database system 400 does not support encryption. If the encryptability check identifies any data in the data to encrypt 415 that is not a valid candidate for encryption, the validation server 410 may refrain from encrypting the data. In some cases, the validation server 410 may pass any data to encrypt 415 that passes the encryptability check to the first validation bucket 420. In other cases, the validation server 410 may halt the encryption process for all of the data to encrypt 415 if any of the data fails the encryptability check.

At the first validation bucket 420, the validation server 410 may run a first round of validators on the data to encrypt 415. The first round of validators may detect whether a specific tenant, organization, or user associated with the data to encrypt 415 defines any customizations preventing encryption of the data. For example, a tenant may include a criteria-based sharing rule, a mobile configuration filtering on the data field to be encrypted, or any similar tenant-specific customizations that result in encryption incompatible data to encrypt 415. The first validation bucket 420 may detect any of these encryption incompatible customizations, and may halt the encryption process. In certain examples, the first validation bucket 420 may include other types of validators and checks. In some cases, the validation server 410 may perform the first round of validators synchronously on different data objects or data fields included in the data to encrypt 415. For example, the validation server 410 may implement bulkification to run the validators on multiple data fields simultaneously. However, in some cases, the validation server 410 may halt encryption for the entire set of data to encrypt 415 if at least one of the data objects or data fields fails the first round of validators.

If the data successfully passes the first validation bucket 420, the validation server 410 may mark the data to encrypt 415 in a pending state. The validation server 410 may assign an encryption in progress state 425 to the data, for example, by setting an indicator bit or bit sequence. When marked with this pending state, the database system 400 may apply encryption constraints to the data (e.g., at the metadata level) as if the data is encrypted. In this way, plaintext values that have not yet been encrypted may be treated as ciphertext values by the database system 400. The validation server 410 may generate and enqueue a message for performing the remaining validation steps. Based on the message, the validation server 410 may send the data in the encryption in progress state 425 to the second validation bucket 430.

The second validation bucket 430 may include a second round of validators to perform asynchronous validation processes on the data. As the second validation bucket 430 is performed asynchronously, the validation server 410 may run one of these validators as a background job while the database system 400 performs other data processing. The validators may detect encryption incompatibilities in different data fields or data objects of the set of data. For example, a first validator may search for coding incompatibilities, a second validator may search for formula field incompatibilities, a third validator may search for flow processing incompatibilities, etc. In some cases, the validation server 410 may turn on encryption for any data objects or fields that pass the second validation bucket 430, and may not turn on encryption for data objects or fields that fail the second validation bucket 430. In other cases, the validation server 410 may refrain from encrypting any of the data if any data object or field fails the second validation bucket 430. For any data that passes or fails the second round of validators, the validation server 410 may remove the encryption in progress state 425 indication, where data that passes may be marked as encrypted data 435 and data that fails may be marked as plain data. The validation server 410 or another application server may encrypt any data objects or fields that pass the encryptability check and the two validation buckets, and may send the resulting encrypted data 435 to the database 405 to be stored as ciphertext.

In some cases, validation server 410 may send an indication of a validation or encryption result to a user device. For example, the indication may be an email message sent to the user who initiated the encryption request or function definition. The message may indicate whether encryption was enabled, which data objects or fields had encryption enabled, any errors indicating why encryption may not have been enabled, or any combination of these indications.

The validation server 410 or an administrative user may sort validators into either the first validation bucket 420 or the second validation bucket 430 based on potential resources for performing the validations. For example, the second validation bucket 430 may include validators that may be more expensive to run (e.g., with respect to time, processing resources, memory resources, or some combination of these) relative to the validators in the first validation bucket 420. In some cases, validators in the first validation bucket 420 may utilize a set amount of resources, or may utilize a maximum amount of resources below a certain pre-determined threshold (e.g., a threshold time, a threshold amount of server resources, etc.). In contrast, validators in the second validation bucket 430 may potentially result in an amount of resources greater than the pre-determined threshold. For example, the validators in the second validation bucket 430 may perform an unbounded or semi-unbounded number of processes, where each additional process may use additional time or server resources. Accordingly, executing a validator in the second validation bucket 430 may not always exceed the pre-determined threshold amount of resources, but in some cases the validator may exceed the threshold. In some cases, the validation server 410 may separate the validators into more than two buckets using multiple potential resource thresholds. Splitting the validators into at least two buckets may improve efficiency of the validation process, as the first validation bucket 420 may synchronously perform validation processes with a bounded amount of work, and the second validation bucket 430 may asynchronously perform validation processes with an unbounded or semi-unbounded amount of work.

Figure 5:
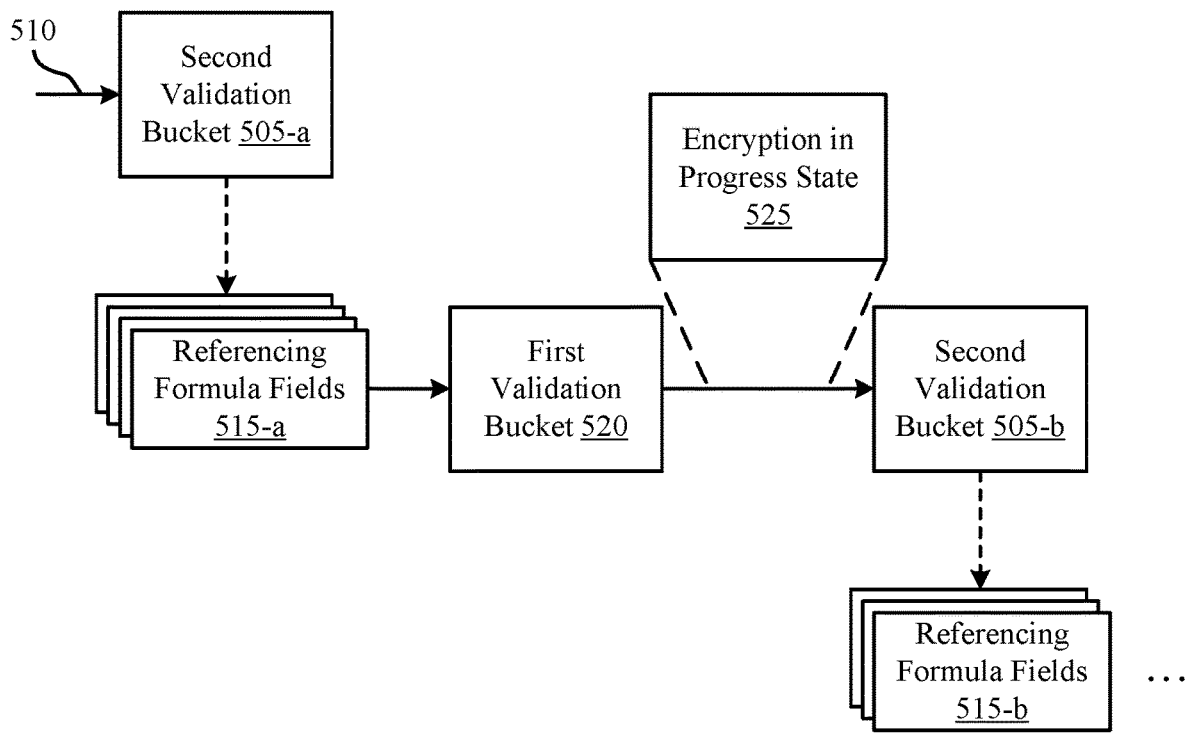
FIG. 5 illustrates an example of a recursive validation procedure that supports enabling and validating data encryption in accordance with aspects of the present disclosure.

FIG. 5 illustrates an example of a recursive validation procedure 500 that supports enabling and validating data encryption in accordance with various aspects of the present disclosure. The recursive validation procedure 500 may be performed by a validation server as described with respect to FIGS. 3 and 4. For example, the recursive validation procedure 500 may be an aspect of the validation process described with respect to FIG. 4. As illustrated, the recursive validation procedure 500 may be performed by one or more validators in second validation bucket 505-*a*, which may be an example of the second validation bucket 430. These validators may be processed asynchronously in the second validation bucket 505 due to the unbounded or semi-unbounded nature of the recursive validation procedure 500. For example, each identified referencing formula field 515 may increase the time and server resources needed to execute the validator, resulting in a large overhead for a large number of referencing formula fields 515. Accordingly, each validator may be efficiently constructed to handle visiting a large number of referencing fields (e.g., visiting thousands or millions of fields).

At 510, second validation bucket 505-*a* may receive a data field marked for encryption. A validator in second validation bucket 505-*a* may identify any formula fields that reference the data field. For example, the validation server or data center may store indications of referencing formula fields 515-*a* for different data object or data field types. In other cases, the validator may search the data center for any formula fields (e.g., standard or custom formula fields) that reference the data field. A referencing formula field 515 may refer to any formula that uses the data field as an input variable. The validator may then perform a validation process on the identified referencing formula fields 515-*a* (e.g., as if the identified referencing formula fields 515-*a* are also data fields marked for encryption). To improve efficiency, the validation server may perform a first set of validators belonging to a first validation bucket 520 synchronously on the identified referencing formula fields 515-*a*. For example, if the validation server identifies four formula fields referencing the data field marked for encryption, the validation server may then perform validators (e.g., from the first validation bucket 520) on each of the four formula fields at a same time. Just as in the validation process described above, the validation server may mark the identified referencing formula fields 515-*a* to indicate an encryption in progress state 525, and may execute a second set of validators from second validation bucket 505-*b*. Second validation bucket 505-*b* may include the same set of validators as second validation bucket 505-*a*, and may once again identify referencing formula fields 515-*b*. That is, because the encryption constraints for the data field marked for encryption are also applied to the referencing formula fields 515-*a*, in turn any formula fields referencing these formula fields 515-*a* may be checked for encryption capabilities. The identified referencing formula fields 515-*b* may be said to indirectly reference the data field marked for encryption (e.g., via one or more of the referencing formula fields 515-*a*).

The validation server may in turn perform a validation process on each of these identified referencing formula fields 515-*b*, which may result in additional referencing formula fields 515 that reference the formula fields 515-*b*. The process of iteratively identifying all of the formula fields that directly or indirectly reference the data field for encryption may be referred to as formula field spidering. The validation server may validate that each of these referencing formula fields 515 supports encryption. In some cases, if the validation server identifies a referencing formula field 515 that does not support encryption, the validation server may halt the formula field spidering, refrain from encrypting the data field, and send an indication of the encryption incompatible formula field 515 to a user device. This may be referred to as a "fail fast" validation mode. In other cases, the validation server may store an indication of the encryption incompatible formula field 515, and may continue the formula field spidering. In these cases, the validation server may identify each encryption incompatible formula field 515, may refrain from encrypting the data field, and may indicate to the user device the set of encryption incompatible formula fields 515. In some examples, a user or organization may select between the "fail fast" mode and performing the complete formula field spidering process (e.g., using a perm or flag). The validation server may perform formula field spidering until identifying an encryption incompatible formula field 515, until reaching a maximum number of referencing formula fields 515 for validation (e.g., either a pre-determined or user-specified threshold, such as twenty-five referencing formula fields 515), until parsing a maximum number of formulas (e.g., either a pre-determined or user-specified threshold, such as one hundred formulas), or until every direct and indirect referencing formula field 515 has been validated. The validation server or another application server may encrypt the data field marked for encryption if all of the identified referencing formula fields 515 (e.g., up to the maximum number of referencing formula fields) support encryption.

In one specific example, a contact data object may include a custom formula field "Full_Name_c." The custom formula for "Full_Name_c" may be defined as:

FirstName+' '+LastName, where "FirstName" and "LastName" are other data fields associated with the contact data object. If a user selects to turn on encryption for Contact.FirstName, the validation server may identify the referencing formula field 515 "Full_Name_c," and may determine that "Full_Name_c" is encryption compatible. If no other formula fields reference either "FirstName" or "Full_Name_c," the validation server may complete the formula field spidering, and may encrypt Contact.FirstName (e.g., if the encryption process passes all other validators). However, in some cases, the data center may contain a code class that includes a query, where the query sorts or filters on "FirstName" or "Full_Name_c." In this case, the code class is encryption incompatible, and the validation server may refrain from encrypting Contact.FirstName. Additionally or alternatively, the data center may include an additional formula field (e.g., a custom formula field) including an operator or function that does not support encryption. For example, a formula field "Upper_Case_Name_c" may be defined as:

upper(Full_Name_c).

In this case, formula field spidering may identify "Upper_Case_Name_c" as indirectly referencing "FirstName," and the validation server may determine that the upper( ) function does not support encryption (i.e., converting ciphertext to uppercase would not have the intended effect of converting the corresponding plaintext to uppercase). The validation server may accordingly refrain from encrypting Contact.FirstName.

The above recursive validation procedure 500 may result in a large overhead for a validation server. For example, depending on the number of standard and custom formula fields implemented by a user or organization, the recursive validation procedure 500 may result in a validator visiting and parsing thousands or millions of data fields, incurring a large time or processing overhead. To optimize the validation process, as well as include protections against scalability risks, a validation server may implement one or more protection techniques.

In an example protection technique, the validation server may implement a user-specific or organization-specific perm or flag. The validation server may operate in different validation modes based on whether the perm or flag is turned on. If the perm or flag is turned on, the validation server may perform validation using the processes described above. For example, the validation server may perform reference tracking, an encryptability check, a validation service, and a "MightReferenceCiphertext" indication. If the perm or flag is turned off, the validation server may conserve resources by automatically identifying a data field as non-encryptable if the data field is referenced by any formula fields 515. In such cases, the validation server may visit a maximum number of formula fields equal to the number of data fields to encrypt, and may not perform parsing of the formulas. Turning the perm off may avoid the costly formula field spidering operation, but may limit the number of data fields that support encryption. In this case, the validation server may just perform reference tracking, without performing the further validation operations.

Figure 6:
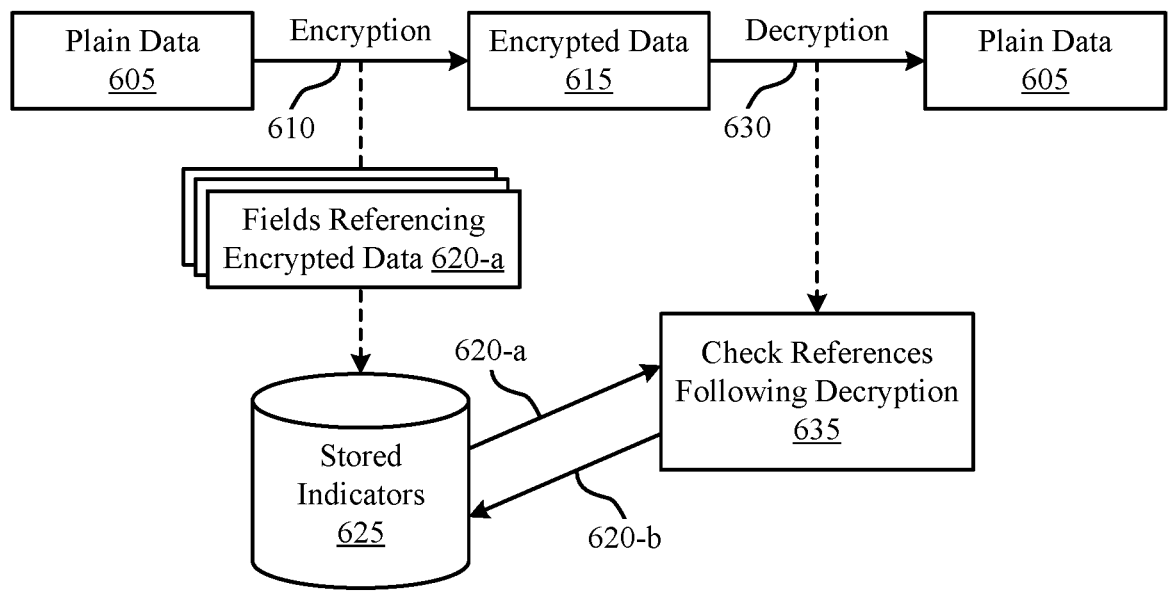
FIG. 6 illustrates an example of a field tracking process that supports enabling and validating data encryption in accordance with aspects of the present disclosure.

FIG. 6 illustrates an example of a field tracking process 600 that supports enabling and validating data encryption in accordance with various aspects of the present disclosure. The field tracking process 600 may be performed by one or more components of a data center, such as an application server (e.g., a validation server) or a database. In some cases, the data center may perform the field tracking process 600 while performing encryption enablement and validation. In other cases, the data center may perform the field tracking process 600 when saving new or updated formula field types. The data center and its components may perform formula field spidering (e.g., as described above, with reference to FIG. 5), data type indication cleaning, or a combination thereof using the stored indicators 625 of fields referencing encrypted data 620-a.

In an encryption scenario, a data center may receive an encryption request for plain data 605. The data center (e.g., utilizing a validation server, as described above with reference to FIGS. 3 through 5) may perform an encryption process 610 to convert the plain data 605 into encrypted data 615. During the encryption process 610, the validation server may perform one or more validation processes on the plain data 605 and formula fields directly or indirectly referencing the plain data 605. The validation server may identify each formula field referencing the plain data 605. When the plain data 605 is encrypted, the validation server may generate or update a data type indication marker for each of the referencing formula fields. The data type indication marker may indicate the type of data (e.g., encrypted or un-encrypted) that the formula field may reference. In some cases, the data type indication marker may be referred to as a "MightReferenceCiphertext" indication. The validation server may store the indications of fields that may reference encrypted data 620-a in a database (e.g., as the stored indicators 625). These indicators may later be referenced by other data center processes. For example, when defining a new formula field or updating an existing formula field, the validation server may check the stored indicators 625 for each field referencing or referenced by the new or updated formula field. If one or more of the referenced fields may reference ciphertexts, the data center may not save the new formula field if the new formula field is not also encryption compatible.

To keep the stored indicators 625 updated, the data center may perform data type indication cleaning when performing a decryption process 630. For example, the data center may receive a decryption request for encrypted data 615. The data center may perform a decryption process 630 to convert the encrypted data 615 back into plain data 605. An application server (e.g., a validation server) may check field references during the finish phase of the decryption process at 635. The check may involve retrieving the indications of fields that may reference encrypted data 620-a, and determining whether each of the fields still may reference ciphertext. If, based on the decryption process 615, one or more of the fields no longer may reference ciphertext, the server may update the data type indications, and may store the updated indications of fields that may reference encrypted data 620-b with the stored indicators 625. In this way, the data center may save new or updated formula fields that reference other formula fields, as these other formula fields may accurately reflect that they can no longer reference ciphertext.

Figure 7:
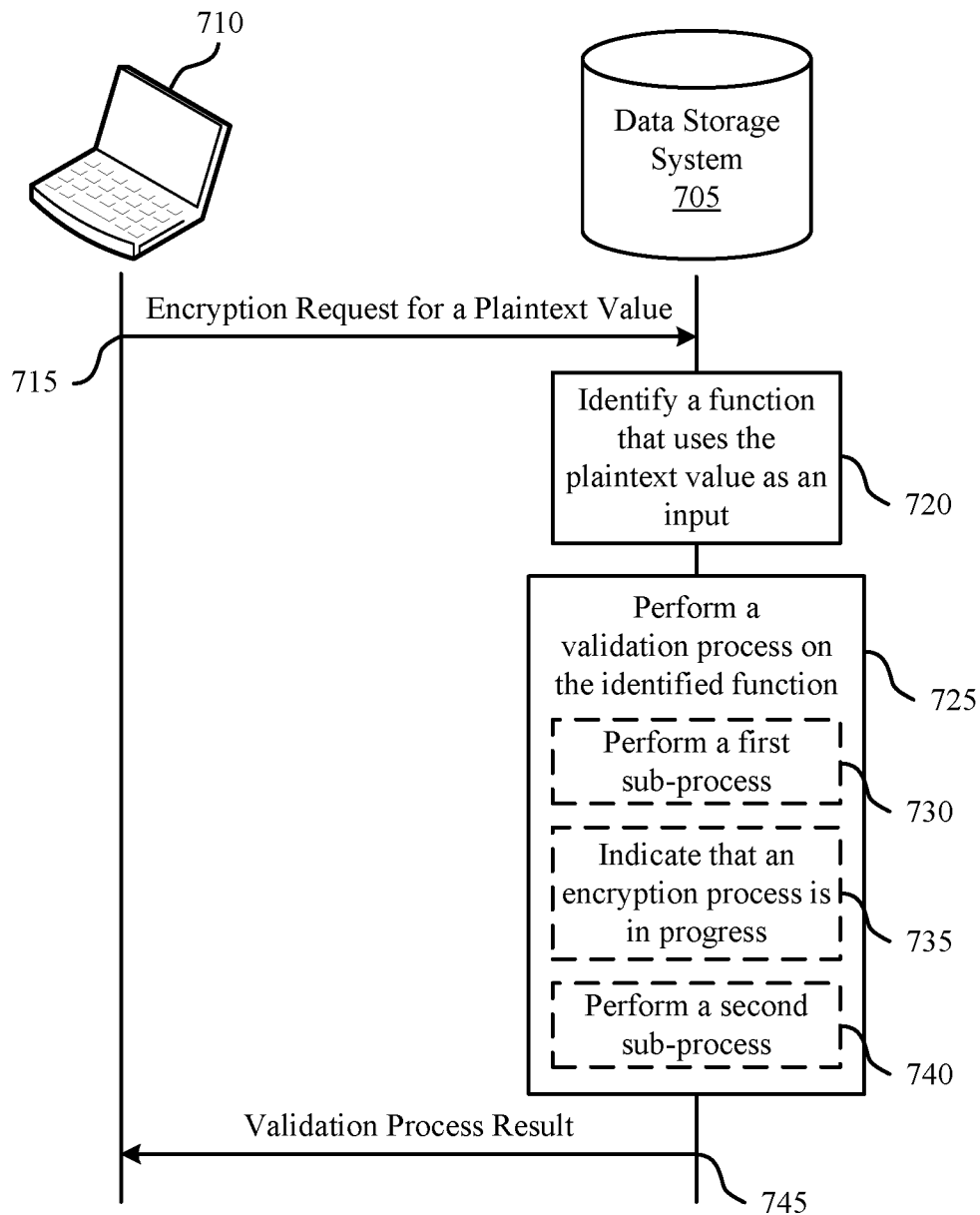
FIG. 7 illustrates an example of a process flow that supports enabling and validating data encryption in accordance with aspects of the present disclosure.

FIG. 7 illustrates an example of a process flow 700 that supports enabling and validating data encryption in accordance with various aspects of the present disclosure. The process flow 700 may include a data storage system 705 and a user device 710. The data storage system 705 may be an example of a data center, database, or server (e.g., database server, validation server, application server, etc.) as described with reference to FIGS. 1 through 4. The user device 710 may be an example of a user device or cloud client as described with reference to FIGS. 1 through 4. The data storage system 705 may enable and validate data encryption to handle encryption incompatibilities for one or more data object types or fields.

At 715, the user device 710 may send an encryption request to the data storage system 705. The encryption request may indicate a plaintext value (e.g., associated with a data object or field) stored in the data storage system 705.

At 720, the data storage system 705 may identify a function within the data storage system 705 that uses the plaintext value as an input. For example, the data storage system 705 may identify a formula field that references the plaintext value. In some cases, the data storage system 705 may perform formula field spidering, and may identify additional functions that reference the output of the identified function.

At 725, the data storage system 705 may perform a validation process in response to the encryption request. For example, the data storage system 705 may validate that the identified functions which directly or indirectly (e.g., via formula field spidering) reference the plaintext value are encryption compatible. Based on this validation process, the data storage system 705 may determine whether a data type, function, or query associated with the plaintext value supports encryption.

In some cases, the validation process may involve at least a first sub-process, an in-progress stage, and a second sub-process. For example, at 730, the data storage system 705 may perform a first sub-process of the validation process. In some cases, the first sub-process may be an example of a first validation bucket containing one or more validators (e.g., field validations), where a potential time or amount of server resources for executing the validators is below a pre-determined time or resource threshold. The data storage system 705 may perform the validators of the first sub-process synchronously.

At 735, the data storage system 705 may indicate, prior to performing the second sub-process of the validation process, that an encryption process of the plaintext is in progress. For example, the data storage system 705 may enable encryption constraints on the plaintext value.

At 740, the data storage system 705 may perform the second sub-process of the validation process. In some cases, the second sub-process may be an example of a second validation bucket containing one or more validators (e.g., field validations), where a potential time or amount of server resources for executing the validators is greater than or equal to the pre-determined time or resource threshold. Performing the second sub-process may involve enqueuing the validators into a processing queue, and processing the validators asynchronously according to the order of the processing queue.

At 745, the data storage system 705 may send a validation process result message to the user device 710. If the first validation sub-process failed, the data storage system 705 may not encrypt the plaintext, and may return an indication of why the encryption was not enabled. If the second validation sub-process failed for some plaintexts, but passed for other plaintexts, the data storage system 705 may encrypt the plaintexts that passed the second sub-process, and may not encrypt the plaintexts that failed. The data storage system 705 may send an indication of which plaintexts are encrypted into ciphertexts and which plaintexts the data storage system 705 refrained from encrypting. In this way, the user device 710 may display an indication of the enablement and validation results.

Figure 8:
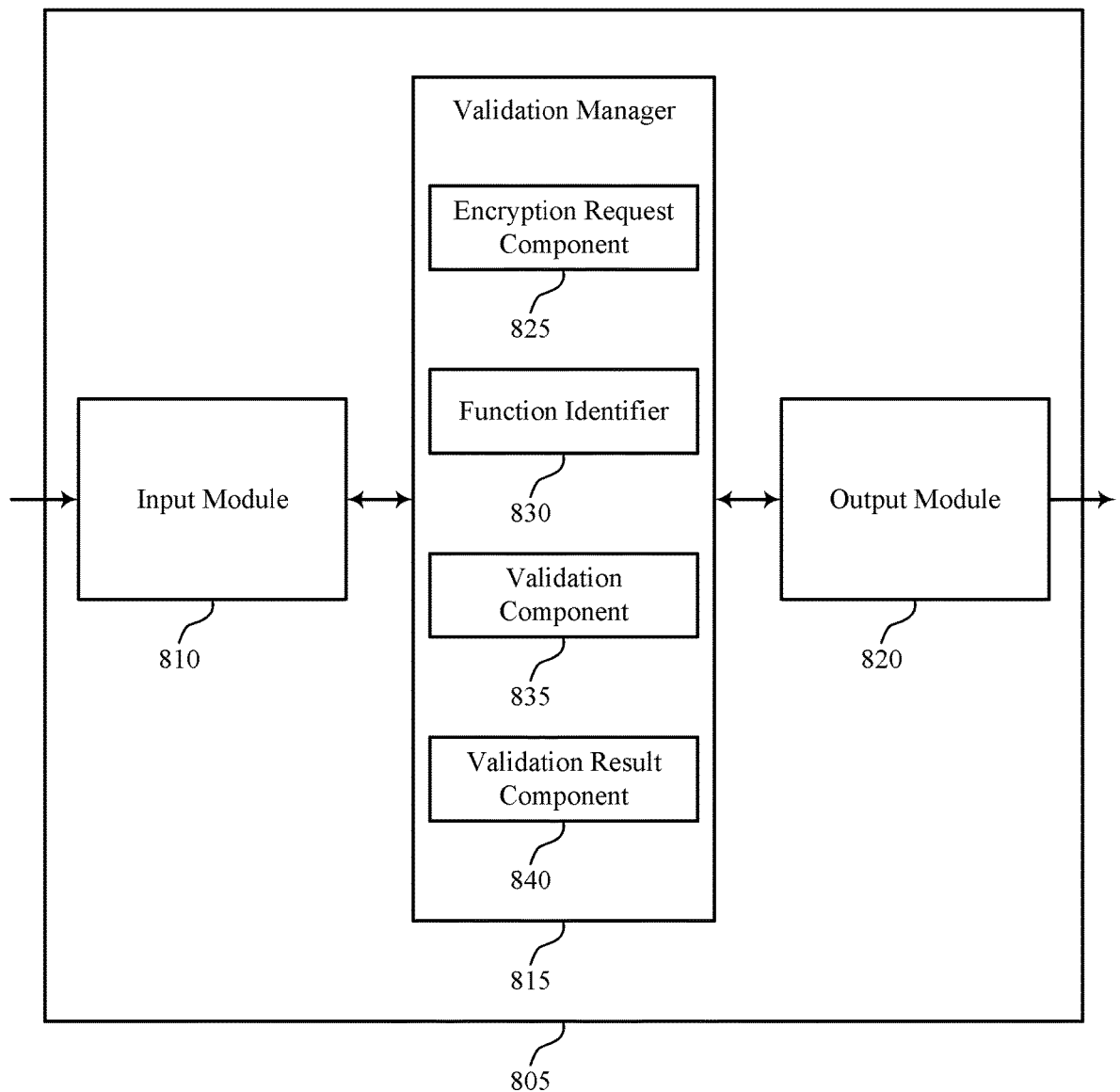
FIGS. 8 and 9 show block diagrams of a device that supports enabling and validating data encryption in accordance with aspects of the present disclosure.

FIG. 8 shows a block diagram 800 of an apparatus 805 that supports enabling and validating data encryption in accordance with aspects of the present disclosure. Apparatus 805 may include input module 810, validation manager 815, and output module 820. Apparatus 805 may also include a processor. Each of these components may be in communication with one another (e.g., via one or more buses). In some cases, apparatus 805 may be an example of a user terminal, a database server, or a system containing multiple computing devices.

Validation manager 815 may be an example of aspects of the validation manager 915 or 1015 described with reference to FIGS. 9 and 10. Validation manager 815 may also include encryption request component 825, function identifier 830, validation component 835, and validation result component 840.

Validation manager 815 and/or at least some of its various sub-components may be implemented in hardware, software executed by a processor, firmware, or any combination thereof. If implemented in software executed by a processor, the functions of the validation manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The validation manager 815 and/or at least some of its various sub-components may be physically located at various positions, including being distributed such that portions of functions are implemented at different physical locations by one or more physical devices. In some examples, validation manager 815 and/or at least some of its various sub-components may be a separate and distinct component in accordance with various aspects of the present disclosure. In other examples, validation manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Encryption request component 825 may receive, at a data storage system, a request to encrypt a plaintext value stored in the data storage system. Function identifier 830 may identify a function in the data storage system that uses the plaintext value as an input. Validation component 835 may perform a validation process in response to the request, where the validation process determines whether the function supports using encrypted data as the input. Validation result component 840 may transmit an indication of a result of the validation process.

Figure 9:
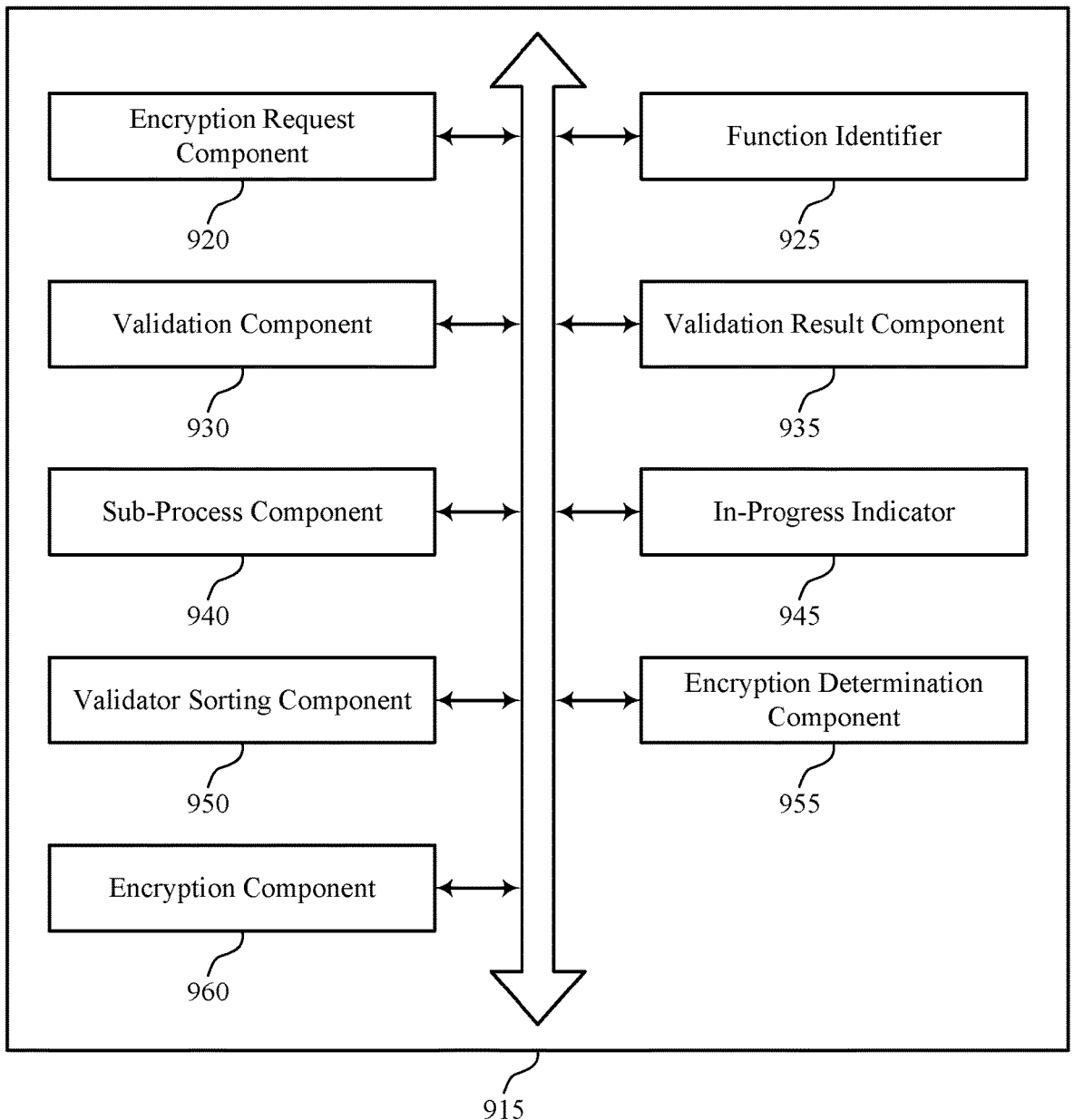

FIG. 9 shows a block diagram 900 of a validation manager 915 that supports enabling and validating data encryption in accordance with aspects of the present disclosure. The validation manager 915 may be an example of aspects of a validation manager 815 or 1015 described with reference to FIGS. 8 and 10. The validation manager 915 may include encryption request component 920, function identifier 925, validation component 930, validation result component 935, sub-process component 940, in-progress indicator 945, validator sorting component 950, encryption determination component 955, and encryption component 960. Each of these modules may communicate, directly or indirectly, with one another (e.g., via one or more buses).

Encryption request component 920 may receive, at a data storage system, a request to encrypt a plaintext value stored in the data storage system. In some cases, encryption request component 920 may receive, at the data storage system, a second request to encrypt a second plaintext value stored in the data storage system, where the second request is associated with the request and where performing a validation process is in response to both the request and the second request.

Function identifier 925 may identify a function in the data storage system that uses the plaintext value as an input. In some cases, function identifier 925 may identify at least one additional function in the data storage system that uses an output of the function as an additional function input, where the validation process further determines whether the at least one additional function supports using encrypted data as the additional function input.

Validation component 930 may perform a validation process in response to the request, where the validation process determines whether the function supports using encrypted data as the input. In some cases, the validation process further determines whether a data type associated with the plaintext value, an additional function associated with the plaintext value, a query associated with the plaintext value, or a combination thereof supports encryption. Validation result component 935 may transmit an indication of a result of the validation process.

Sub-process component 940 may perform a first sub-process of the validation process. In-progress indicator 945 may indicate, prior to performing a second sub-process of the validation process, that an encryption process of the plaintext value is in progress. Sub-process component 940 may then perform the second sub-process of the validation process. In some cases, the first sub-process includes a set of field validations, and performing the first sub-process further includes performing each field validation of the set of field validations synchronously. In some cases, the second sub-process includes a set of field validations, and performing the second sub-process further includes enqueuing each field validation of the set of field validations into a processing queue, and processing the set of field validations asynchronously according to an order of the processing queue. In some cases, indicating that the encryption process of the plaintext value is in progress includes enabling an encryption constraint on the plaintext value.

Validator sorting component 950 may sort a number of validators into a first validator bucket and a second validator bucket, where the validator buckets correspond to the sub-processes. In some cases, the validators may be sorted such that a potential time used to perform the first sub-process is below a pre-determined time threshold. In other cases, the validators may be sorted such that a potential amount of server resources used to perform the first sub-process is below a pre-determined resource threshold.

In some cases, encryption determination component 955 may determine a negative result of the first sub-process associated with the plaintext value, a second plaintext value, or a combination thereof, and may refrain from encrypting both the plaintext value and the second plaintext value based on the negative result. In other cases, encryption determination component 955 may determine a negative result of the second sub-process associated with the plaintext value and a positive result of the second sub-process associated with a second plaintext value, and encryption determination component 955 may refrain from encrypting the plaintext value based on the negative result while encrypting the second plaintext value based on the positive result.

Encryption component 960 may encrypt the plaintext value based on the result of the validation process.

Figure 10:
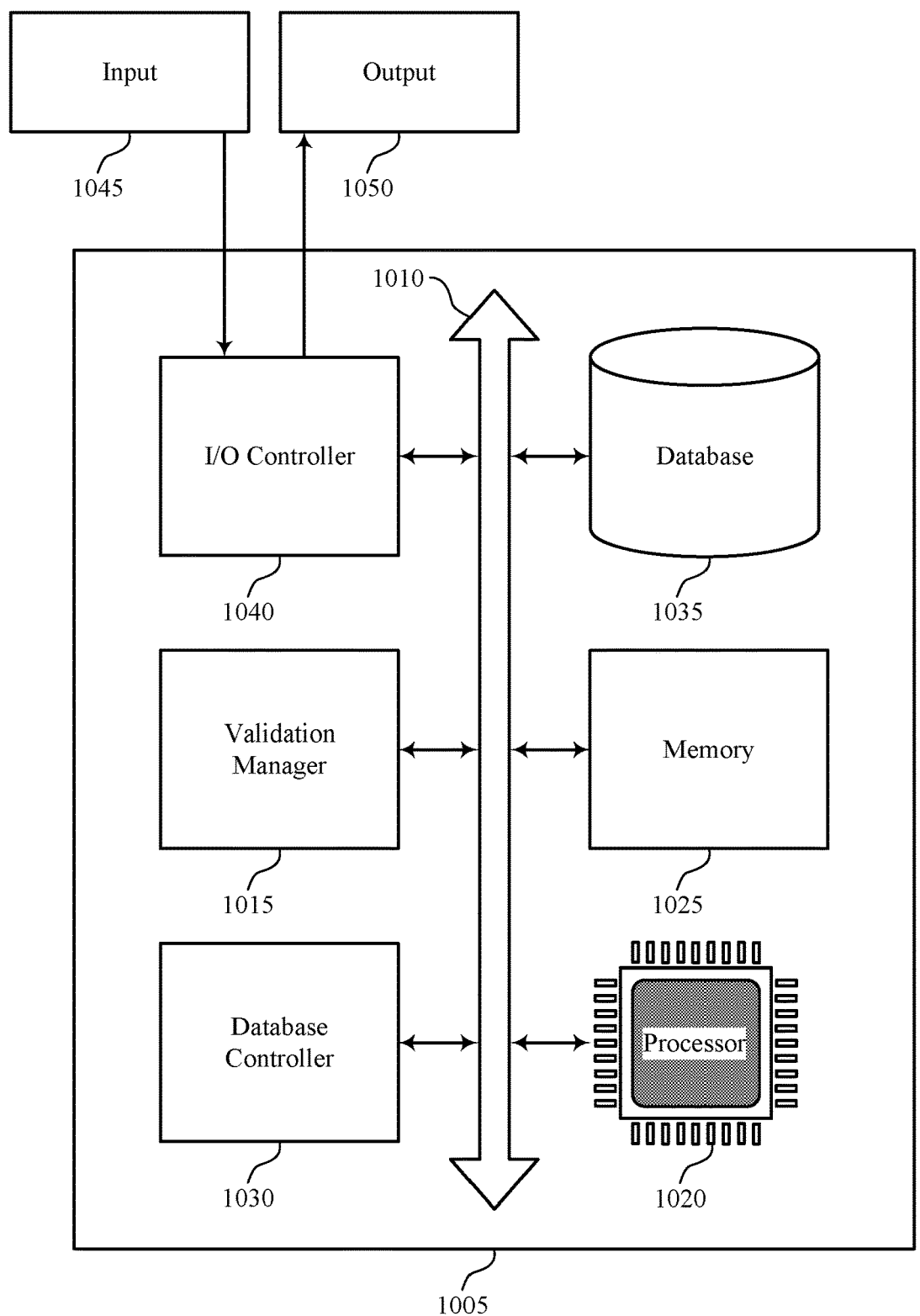
FIG. 10 illustrates a block diagram of a system including a database server that supports enabling and validating data encryption in accordance with aspects of the present disclosure.

FIG. 10 shows a diagram of a system 1000 including a device 1005 that supports enabling and validating data encryption in accordance with aspects of the present disclosure. Device 1005 may be an example of or include the components of database server ### as described above, e.g., with reference to FIG. 1. Device 1005 may include components for bi-directional data communications including components for transmitting and receiving communications, including validation manager 1015, processor 1020, memory 1025, database controller 1030, database 1035, and I/O controller 1040. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting enabling and validating data encryption).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Database controller 1030 may manage data storage and processing in database 1035. In some cases, a user may interact with database controller 1030. In other cases, database controller 1030 may operate automatically without user interaction. Database 1035 may be an example of a single database, a distributed database, multiple distributed databases, or an emergency backup database.

I/O controller 1040 may manage input and output signals for device 1005. I/O controller 1040 may also manage peripherals not integrated into device 1005. In some cases, I/O controller 1040 may represent a physical connection or port to an external peripheral. In some cases, I/O controller 1040 may utilize an operating system such as iOS®, ANDROID®, MS-DOS®, MS-WINDOWS®, OS/2®, UNIX®, LINUX®, or another known operating system. In other cases, I/O controller 1040 may represent or interact with a modem, a keyboard, a mouse, a touchscreen, or a similar device. In some cases, I/O controller 1040 may be implemented as part of a processor. In some cases, a user may interact with device 1005 via I/O controller 1040 or via hardware components controlled by I/O controller 1040.

Figure 11:
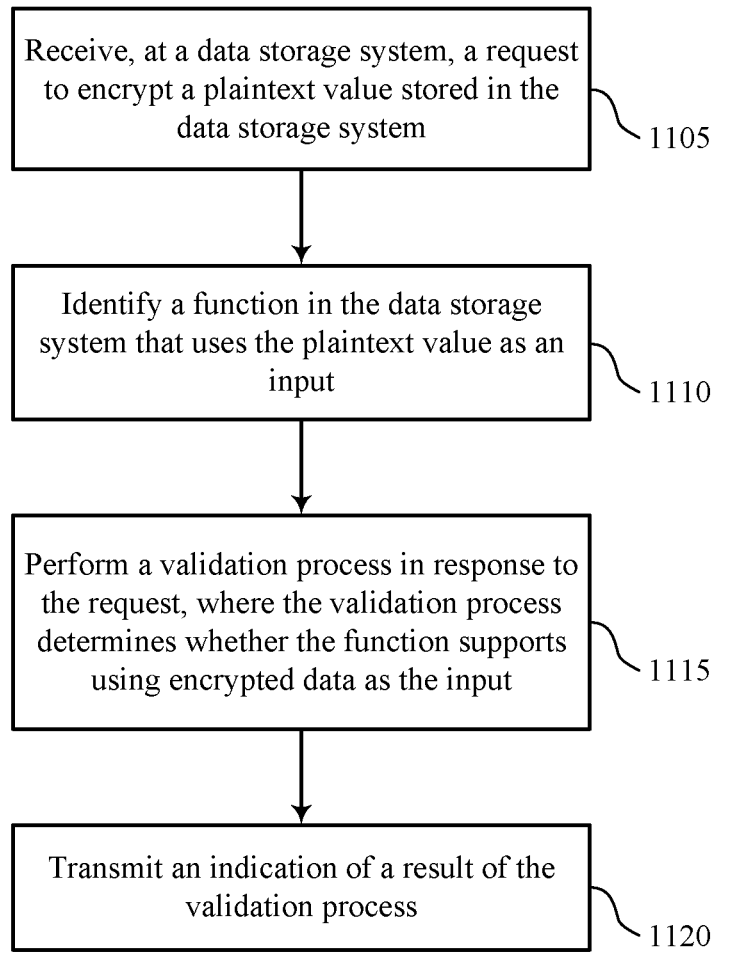
FIGS. 11 through 13 illustrate methods for enabling and validating data encryption in accordance with aspects of the present disclosure.

FIG. 11 shows a flowchart illustrating a method 1100 for enabling and validating data encryption in accordance with aspects of the present disclosure. The operations of method 1100 may be implemented by a database server or its components as described herein. The database server may be a component of a data storage system, and may be an example or component of a data center, database, or validation server as described with reference to FIGS. 1, 3, and 4. For example, the operations of method 1100 may be performed by a validation manager as described with reference to FIGS. 8 through 10. In some examples, a database server may execute a set of codes to control the functional elements of the device to perform the functions described below. Additionally or alternatively, the database server may perform aspects of the functions described below using special-purpose hardware.

At 1105 the database server may receive a request to encrypt a plaintext value stored in a data storage system. The operations of 1105 may be performed according to the methods described herein. In certain examples, aspects of the operations of 1105 may be performed by an encryption request component as described with reference to FIGS. 8 through 10.

At 1110 the database server may identify a function in the data storage system that uses the plaintext value as an input. The operations of 1110 may be performed according to the methods described herein. In certain examples, aspects of the operations of 1110 may be performed by a function identifier as described with reference to FIGS. 8 through 10.

At 1115 the database server may perform a validation process in response to the request, where the validation process determines whether the function supports using encrypted data as the input. The operations of 1115 may be performed according to the methods described herein. In certain examples, aspects of the operations of 1115 may be performed by a validation component as described with reference to FIGS. 8 through 10.

At 1120 the database server may transmit an indication of a result of the validation process. The operations of 1120 may be performed according to the methods described herein. In certain examples, aspects of the operations of 1120 may be performed by a validation result component as described with reference to FIGS. 8 through 10.

Figure 12:
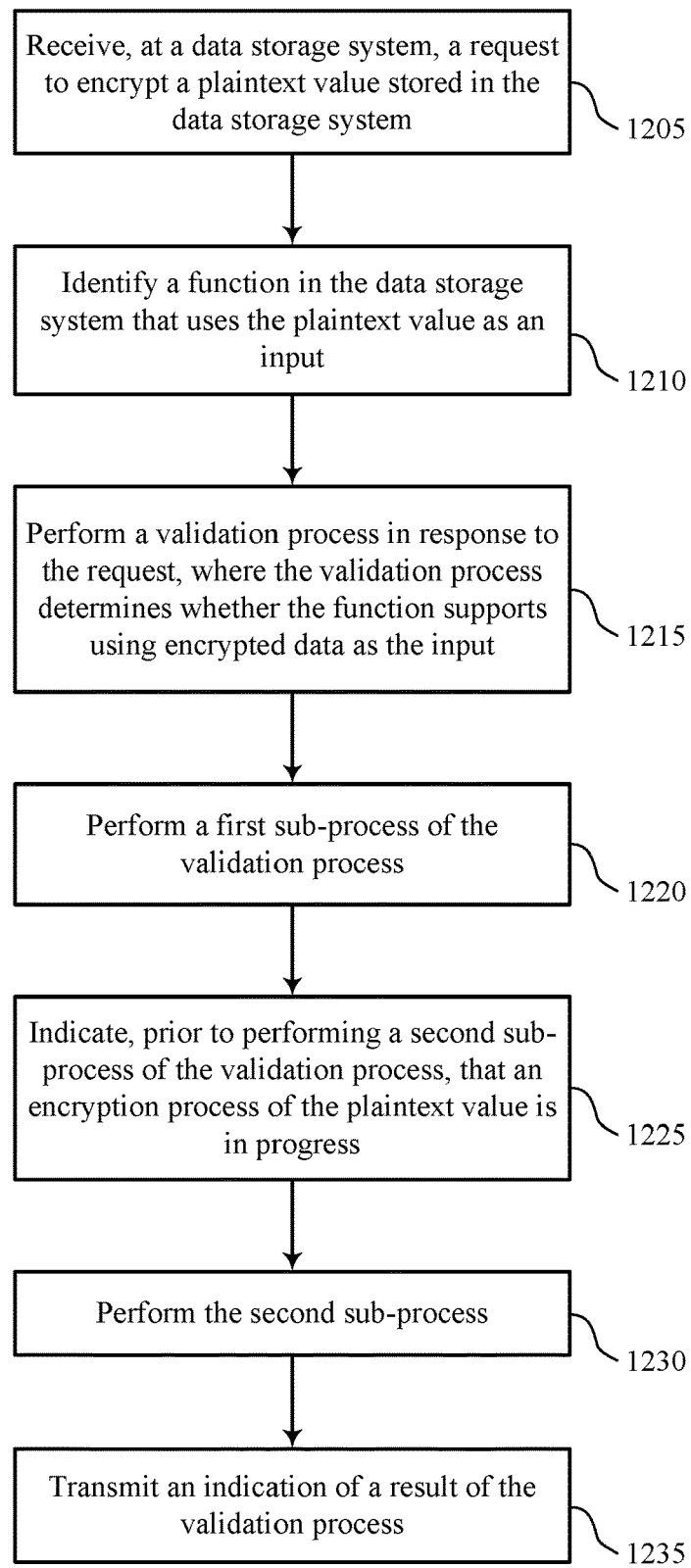

FIG. 12 shows a flowchart illustrating a method 1200 for enabling and validating data encryption in accordance with aspects of the present disclosure. The operations of method 1200 may be implemented by a database server or its components as described herein. The database server may be a component of a data storage system, and may be an example or component of a data center, database, or validation server as described with reference to FIGS. 1, 3, and 4. For example, the operations of method 1200 may be performed by a validation manager as described with reference to FIGS. 8 through 10. In some examples, a database server may execute a set of codes to control the functional elements of the device to perform the functions described below. Additionally or alternatively, the database server may perform aspects of the functions described below using special-purpose hardware.

At 1205 the database server may receive a request to encrypt a plaintext value stored in a data storage system. The operations of 1205 may be performed according to the methods described herein. In certain examples, aspects of the operations of 1205 may be performed by an encryption request component as described with reference to FIGS. 8 through 10.

At 1210 the database server may identify a function in the data storage system that uses the plaintext value as an input. The operations of 1210 may be performed according to the methods described herein. In certain examples, aspects of the operations of 1210 may be performed by a function identifier as described with reference to FIGS. 8 through 10.

At 1215 the database server may perform a validation process in response to the request, where the validation process determines whether the function supports using encrypted data as the input. The operations of 1215 may be performed according to the methods described herein. In certain examples, aspects of the operations of 1215 may be performed by a validation component as described with reference to FIGS. 8 through 10.

At 1220 the database server may perform a first sub-process of the validation process. The operations of 1220 may be performed according to the methods described herein. In certain examples, aspects of the operations of 1220 may be performed by a sub-process component as described with reference to FIGS. 8 through 10.

At 1225 the database server may indicate, prior to performing a second sub-process of the validation process, that an encryption process of the plaintext value is in progress. The operations of 1225 may be performed according to the methods described herein. In certain examples, aspects of the operations of 1225 may be performed by an in-progress indicator as described with reference to FIGS. 8 through 10.

At 1230 the database server may perform the second sub-process. The operations of 1230 may be performed according to the methods described herein. In certain examples, aspects of the operations of 1230 may be performed by a sub-process component as described with reference to FIGS. 8 through 10.

At 1235 the database server may transmit an indication of a result of the validation process. The operations of 1235 may be performed according to the methods described herein. In certain examples, aspects of the operations of 1235 may be performed by a validation result component as described with reference to FIGS. 8 through 10.

Figure 13:
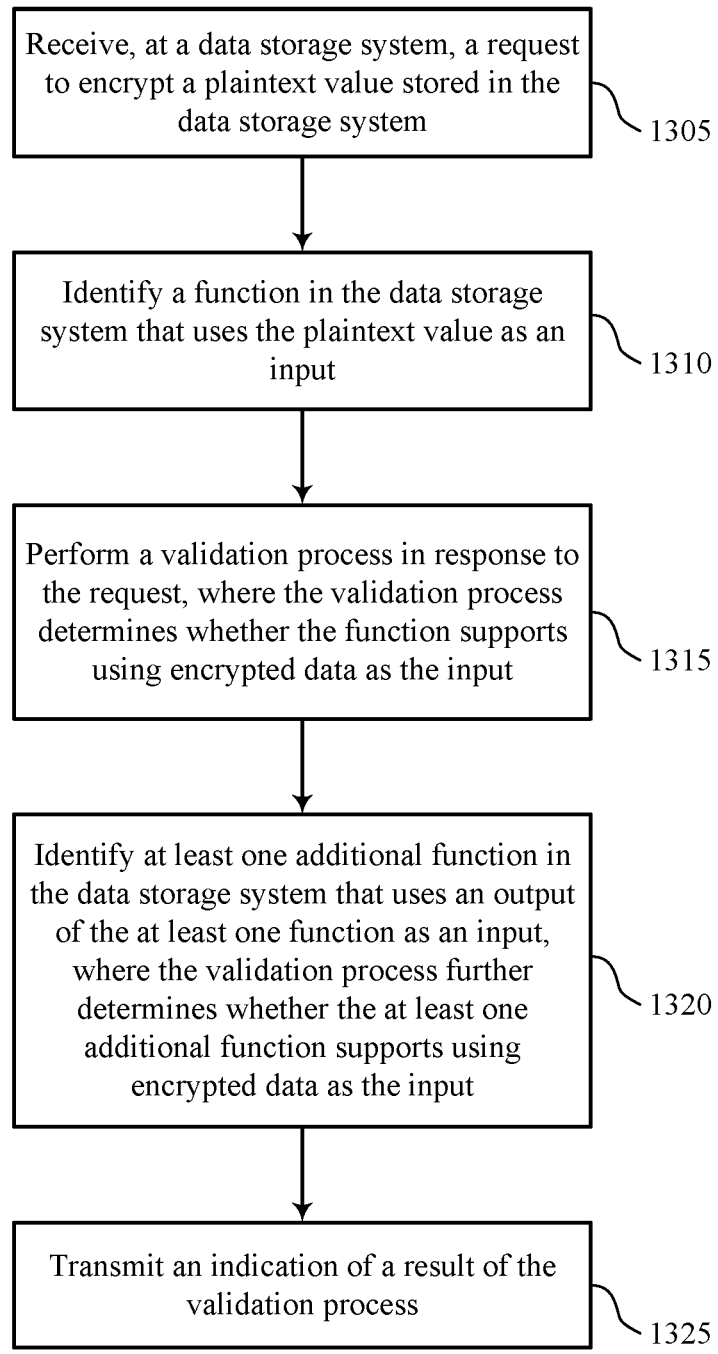

FIG. 13 shows a flowchart illustrating a method 1300 for enabling and validating data encryption in accordance with aspects of the present disclosure. The operations of method 1300 may be implemented by a database server or its components as described herein. The database server may be a component of a data storage system, and may be an example or component of a data center, database, or validation server as described with reference to FIGS. 1, 3, and 4. For example, the operations of method 1300 may be performed by a validation manager as described with reference to FIGS. 8 through 10. In some examples, a database server may execute a set of codes to control the functional elements of the device to perform the functions described below. Additionally or alternatively, the database server may perform aspects of the functions described below using special-purpose hardware.

At 1305 the database server may receive a request to encrypt a plaintext value stored in a data storage system. The operations of 1305 may be performed according to the methods described herein. In certain examples, aspects of the operations of 1305 may be performed by an encryption request component as described with reference to FIGS. 8 through 10.

At 1310 the database server may identify a function in the data storage system that uses the plaintext value as an input. The operations of 1310 may be performed according to the methods described herein. In certain examples, aspects of the operations of 1310 may be performed by a function identifier as described with reference to FIGS. 8 through 10.

At 1315 the database server may perform a validation process in response to the request, where the validation process determines whether the function supports using encrypted data as the input. The operations of 1315 may be performed according to the methods described herein. In certain examples, aspects of the operations of 1315 may be performed by a validation component as described with reference to FIGS. 8 through 10.

At 1320 the database server may identify at least one additional function in the data storage system that uses an output of the function as an additional function input, where the validation process further determines whether the at least one additional function supports using encrypted data as the additional function input. The operations of 1320 may be performed according to the methods described herein. In certain examples, aspects of the operations of 1320 may be performed by a function identifier as described with reference to FIGS. 8 through 10.

At 1325 the database server may transmit an indication of a result of the validation process. The operations of 1325 may be performed according to the methods described herein. In certain examples, aspects of the operations of 1325 may be performed by a validation result component as described with reference to FIGS. 8 through 10.

A method of data encryption is described. The method may include receiving, at a data storage system, a request to encrypt a plaintext value stored in the data storage system, identifying a function in the data storage system that uses the plaintext value as an input, performing a validation process in response to the request, wherein the validation process determines whether the function supports using encrypted data as the input, and transmitting an indication of a result of the validation process.

An apparatus for data encryption is described. The apparatus may include a processor, memory in electronic communication with the processor, and instructions stored in the memory. The instructions may be operable to cause the processor to receive, at a data storage system, a request to encrypt a plaintext value stored in the data storage system, identify a function in the data storage system that uses the plaintext value as an input, perform a validation process in response to the request, wherein the validation process determines whether the function supports using encrypted data as the input, and transmit an indication of a result of the validation process.

A non-transitory computer-readable medium for data encryption is described. The non-transitory computer-readable medium may include instructions operable to cause a processor to receive, at a data storage system, a request to encrypt a plaintext value stored in the data storage system, identify a function in the data storage system that uses the plaintext value as an input, perform a validation process in response to the request, wherein the validation process determines whether the function supports using encrypted data as the input, and transmit an indication of a result of the validation process.

Some examples of the method, apparatus, and non-transitory computer-readable medium described above may further include processes, features, means, or instructions for performing a first sub-process of the validation process. Some examples of the method, apparatus, and non-transitory computer-readable medium described above may further include processes, features, means, or instructions for indicating, prior to performing a second sub-process of the validation process, that an encryption process of the plaintext value may be in progress. Some examples of the method, apparatus, and non-transitory computer-readable medium described above may further include processes, features, means, or instructions for performing the second sub-process.

In some examples of the method, apparatus, and non-transitory computer-readable medium described above, a potential time used to perform the first sub-process may be below a pre-determined time threshold. In some examples of the method, apparatus, and non-transitory computer-readable medium described above, a potential amount of server resources used to perform the first sub-process may be below a pre-determined resource threshold.

In some examples of the method, apparatus, and non-transitory computer-readable medium described above, indicating that the encryption process of the plaintext value may be in progress comprises enabling an encryption constraint on the plaintext value.

In some examples of the method, apparatus, and non-transitory computer-readable medium described above, the first sub-process comprises a set of field validations, and wherein performing the first sub-process further comprises performing each field validation of the set of field validations synchronously.

In some examples of the method, apparatus, and non-transitory computer-readable medium described above, the second sub-process comprises a set of field validations, and wherein performing the second sub-process further comprises enqueuing each field validation of the set of field validations into a processing queue. Some examples of the method, apparatus, and non-transitory computer-readable medium described above may further include processes, features, means, or instructions for processing the set of field validations asynchronously according to an order of the processing queue.

Some examples of the method, apparatus, and non-transitory computer-readable medium described above may further include processes, features, means, or instructions for receiving, at the data storage system, a second request to encrypt a second plaintext value stored in the data storage system, wherein the second request may be associated with the request and wherein performing the validation process may be in response to both the request and the second request.

Some examples of the method, apparatus, and non-transitory computer-readable medium described above may further include processes, features, means, or instructions for determining a negative result of the first sub-process associated with the plaintext value, the second plaintext value, or a combination thereof. Some examples of the method, apparatus, and non-transitory computer-readable medium described above may further include processes, features, means, or instructions for refraining from encrypting both the plaintext value and the second plaintext value based on the negative result.

Some examples of the method, apparatus, and non-transitory computer-readable medium described above may further include processes, features, means, or instructions for determining a negative result of the second sub-process associated with the plaintext value and a positive result of the second sub-process associated with the second plaintext value. Some examples of the method, apparatus, and non-transitory computer-readable medium described above may further include processes, features, means, or instructions for refraining from encrypting the plaintext value based at least in part on the negative result. Some examples of the method, apparatus, and non-transitory computer-readable medium described above may further include processes, features, means, or instructions for encrypting the second plaintext value based at least in part on the positive result.

Some examples of the method, apparatus, and non-transitory computer-readable medium described above may further include processes, features, means, or instructions for encrypting the plaintext value based at least in part on the result of the validation process.

Some examples of the method, apparatus, and non-transitory computer-readable medium described above may further include processes, features, means, or instructions for identifying at least one additional function in the data storage system that uses an output of the function as an additional function input, wherein the validation process further determines whether the at least one additional function supports using encrypted data as the additional function input.

In some examples of the method, apparatus, and non-transitory computer-readable medium described above, the validation process further determines whether a data type associated with the plaintext value, an additional function associated with the plaintext value, a query associated with the plaintext value, or a combination thereof supports encryption.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data encryption, comprising:
  receiving, at a data storage system, a request to encrypt a plaintext value stored in the data storage system;
  identifying a function in the data storage system that uses the plaintext value as an input;
  determining, based at least in part on the request, potential resources corresponding to a validation process for the function, wherein the validation process determines whether the function is compatible with encrypted data;

performing, in response to the request and based at least in part on the potential resources, a first sub-process of the validation process for the function, the first sub-process utilizing resources less than a threshold amount of resources;

indicating, prior to performing a second sub-process of the validation process, that an encryption process of the plaintext value is in progress;

performing, in response to the request and based at least in part on the potential resources, the second sub-process of the validation process utilizing resources greater than or equal to the threshold amount of resources; and transmitting an indication of a result of the validation process.

2. The method of claim 1, further comprising:
performing the second sub-process.

3. The method of claim 1, wherein a potential time used to perform the first sub-process is below a pre-determined time threshold.

4. The method of claim 1, wherein a potential amount of server resources used to perform the first sub-process is below a pre-determined resource threshold.

5. The method of claim 1, wherein indicating that the encryption process of the plaintext value is in progress comprises enabling an encryption constraint on the plaintext value.

6. The method of claim 1, wherein the first sub-process comprises a set of field validations, and wherein performing the first sub-process further comprises:
performing each field validation of the set of field validations synchronously.

7. The method of claim 1, wherein the second sub-process comprises a set of field validations, and wherein performing the second sub-process further comprises:
enqueuing each field validation of the set of field validations into a processing queue; and
processing the set of field validations asynchronously according to an order of the processing queue.

8. The method of claim 1, further comprising:
receiving, at the data storage system, a second request to encrypt a second plaintext value stored in the data storage system, wherein the second request is associated with the request and wherein performing the validation process is in response to both the request and the second request.

9. The method of claim 8, further comprising:
determining a negative result of the first sub-process associated with the plaintext value, the second plaintext value, or a combination thereof; and
refraining from encrypting both the plaintext value and the second plaintext value based on the negative result.

10. The method of claim 8, further comprising:
determining a negative result of the second sub-process associated with the plaintext value and a positive result of the second sub-process associated with the second plaintext value;
refraining from encrypting the plaintext value based at least in part on the negative result; and
encrypting the second plaintext value based at least in part on the positive result.

11. The method of claim 1, further comprising:
encrypting the plaintext value based at least in part on the result of the validation process.

12. The method of claim 1, further comprising:
identifying at least one additional function in the data storage system that uses an output of the function as an additional function input, wherein the validation process further determines whether the at least one additional function supports using encrypted data as the additional function input.

13. The method of claim 1, wherein the validation process further determines whether a data type associated with the plaintext value, an additional function associated with the plaintext value, a query associated with the plaintext value, or a combination thereof supports encryption.

14. An apparatus for data encryption, comprising:
a processor;
memory in electronic communication with the processor; and
instructions stored in the memory and executable by the processor to cause the apparatus to:
receive, at a data storage system, a request to encrypt a plaintext value stored in the data storage system;
identify a function in the data storage system that uses the plaintext value as an input;
determine, based at least in part on the request, potential resources corresponding to a validation process for the function, wherein the validation process determines whether the function is compatible with encrypted data;
perform, in response to the request and based at least in part on the potential resources, a first sub-process of the validation process for the function, the first sub-process utilizing resources less than a threshold amount of resources;
indicate, prior to performing a second sub-process of the validation process, that an encryption process of the plaintext value is in progress;
perform, in response to the request and based at least in part on the potential resources, the second sub-process of the validation process utilizing resources greater than or equal to the threshold amount of resources; and
transmit an indication of a result of the validation process.

15. The apparatus of claim 14, wherein the instructions are further executable by the processor to cause the apparatus to:
perform the second sub-process.

16. The apparatus of claim 14, wherein the first sub-process comprises a set of field validations, and wherein the instructions for performing the first sub-process are further executable by the processor to cause the apparatus to:
perform each field validation of the set of field validations synchronously.

17. The apparatus of claim 14, wherein the second sub-process comprises a set of field validations, and wherein the instructions for performing the second sub-process are further executable by the processor to cause the apparatus to:
enqueue each field validation of the set of field validations into a processing queue; and
process the set of field validations asynchronously according to an order of the processing queue.

18. The apparatus of claim 14, wherein the instructions are further executable by the processor to cause the apparatus to:
encrypt the plaintext value based at least in part on the result of the validation process.

19. A non-transitory computer-readable medium storing code for data encryption, the code comprising instructions executable by a processor to:
receive, at a data storage system, a request to encrypt a plaintext value stored in the data storage system;

identify a function in the data storage system that uses the plaintext value as an input;

determine, based at least in part on the request, potential resources corresponding to a validation process for the function, wherein the validation process determines whether the function is compatible with encrypted data;

perform, in response to the request and based at least in part on the potential resources, a first sub-process of the validation process for the function, the first sub-process utilizing resources less than a threshold amount of resources;

indicate, prior to performing a second sub-process of the validation process, that an encryption process of the plaintext value is in progress;

perform, in response to the request and based at least in part on the potential resources, the second sub-process of the validation process utilizing resources greater than or equal to the threshold amount of resources; and transmit an indication of a result of the validation process.

20. The non-transitory computer-readable medium of claim 19, wherein the instructions are further executable by the processor to:

perform the second sub-process.

* * * * *